(12) United States Patent
Manchepalli et al.

(10) Patent No.: US 9,860,063 B2
(45) Date of Patent: Jan. 2, 2018

(54) CODE ANALYSIS TOOL FOR RECOMMENDING ENCRYPTION OF DATA WITHOUT AFFECTING PROGRAM SEMANTICS

(71) Applicant: Microsoft Technology Licensing, LLC, Redmond, WA (US)

(72) Inventors: Ajay S. Manchepalli, Sammamish, WA (US); Haohai Yu, Redmond, WA (US); Michael J. Zwilling, Redmond, WA (US); Kapil Vaswani, London (GB); Panagiotis Antonopoulos, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 14/633,596

(22) Filed: Feb. 27, 2015

(65) Prior Publication Data
US 2016/0254911 A1    Sep. 1, 2016

(51) Int. Cl.
*G06F 21/62*    (2013.01)
*H04L 9/08*    (2006.01)
(Continued)

(52) U.S. Cl.
CPC ........ *H04L 9/0897* (2013.01); *G06F 21/6227* (2013.01); *H04L 9/008* (2013.01); *H04L 9/088* (2013.01); *H04L 9/14* (2013.01)

(58) Field of Classification Search
None
See application file for complete search history.

(56) References Cited

U.S. PATENT DOCUMENTS 8,082,144 B1    12/2011    Brown et al.
8,199,911 B1    6/2012    Tsaur et al.
(Continued)

FOREIGN PATENT DOCUMENTS

WO    2007038509 A2    4/2007

OTHER PUBLICATIONS

Puttaswamy, et al., "Silverline: Toward Data Confidentiality in Storage-Intensive Cloud Applications", In Proceedings of the 2nd ACM Symposium on Cloud Computing, Oct. 27, 2011, 13 pages.
(Continued)

*Primary Examiner* — Michael R Vaughan
(74) *Attorney, Agent, or Firm* — Fiala & Weaver P.L.L.C.

(57) ABSTRACT

Systems, methods and computer program products are described that analyze the code of an application and, based on the analysis, identify whether data elements (e.g., columns) referenced by the code can be encrypted, and for those data elements that can be encrypted, recommend an encryption scheme. The recommended encryption scheme for a given data element may be the highest level of encryption that can be applied thereto without affecting the semantics of the application code. The output generated based on the analysis may not only include a mapping of each data element to a recommended encryption scheme, but may also include an explanation of why each recommendation was made for each data element. Such explanation may include, for example, an identification of the application code that gave rise to the recommendation for each data element.

20 Claims, 10 Drawing Sheets

(51) Int. Cl.
*H04L 9/00* (2006.01)
*H04L 9/14* (2006.01)

(56) References Cited

U.S. PATENT DOCUMENTS

| | | | |
|---|---|---|---|
| 8,200,972 | B2 | 6/2012 | Chandran et al. |
| 8,261,240 | B2 | 9/2012 | Hoban et al. |
| 8,819,770 | B2 | 8/2014 | Entin et al. |
| 2003/0177400 | A1 | 9/2003 | Raley et al. |
| 2004/0181679 | A1 | 9/2004 | Dettinger et al. |
| 2006/0210071 | A1 | 9/2006 | Chandran et al. |
| 2007/0005594 | A1* | 1/2007 | Pinkas ............... G06F 21/6263 |
| 2009/0327943 | A1* | 12/2009 | Medvedev ............ G06F 21/577 715/772 |
| 2012/0096281 | A1 | 4/2012 | Eszenyi et al. |
| 2012/0331550 | A1 | 12/2012 | Raj et al. |
| 2013/0191650 | A1 | 7/2013 | Balakrishnan et al. |
| 2014/0130173 | A1* | 5/2014 | Kerschbaum ......... G06F 21/125 726/26 |
| 2014/0195798 | A1 | 7/2014 | Brugger et al. |
| 2014/0281511 | A1 | 9/2014 | Kaushik et al. |
| 2015/0039586 | A1* | 2/2015 | Kerschbaum ..... G06F 17/30463 707/718 |

OTHER PUBLICATIONS

Baumann, et al., "Shielding Applications from an Untrusted Cloud with Haven", In Proceedings of the 11th USENIX Symposium on Operating Systems Design and Implementation, Oct. 6, 2014, 19 pages.

Popa, et al., "CryptDB: Protecting Confidentiality with Encrypted Query Processing", In Proceedings of the Twenty-Third ACM Symposium on Operating Systems Principles, Oct. 23, 2011, 16 pages.

"International Preliminary Report on Patentability Issued in PCT Application No. PCT/US2016/019433", dated Nov. 10, 2016, 8 Pages.

Kerschbaum, et al., "DEMO: Adjustably Encrypted in-Memory Column-Store", In the Proceedings of the 2013 ACM SIGSAC Conference on Computer & Communications Security, pp. 1325-1328.

Kerschbaum, et al., "An Encrypted in-Memory Column-Store: the Onion Selection Problem", In the Processings of International Conference on Information Systems Security, pp. 14-26.

"International Search Report and Written Opinion Issued in PCT Application No. PCT/US2016/019433", dated Jul. 22, 2016, 15 Pages.

\* cited by examiner

CODE ANALYSIS TOOL FOR RECOMMENDING ENCRYPTION OF DATA WITHOUT AFFECTING PROGRAM SEMANTICS

BACKGROUND

Data breaches are an increasing concern as more and more data is digitally stored. For example, data breaches are arguably the main deterrent for the adoption of cloud services for applications that manage sensitive, business critical information. On a public cloud, applications must guard against potentially malicious cloud administrators, malicious co-tenants, and other entities that can obtain access to data through various legal means. Since the compute and storage platform itself cannot be trusted, any data that appears in cleartext anywhere on the cloud platform (on disk, in memory or over the wire) must be considered susceptible to leakage or malicious corruption. In verticals such as finance, banking, and healthcare, compliance requirements mandate strong protection against these types of threats. However, existing security solutions such as Transparent Data Encryption (TDE) and Transport Layer Security (TLS) only protect data at rest and in transit, but leave data vulnerable during computation (data in use).

One way of addressing this issue is the use of partially homomorphic encryption (PHE) schemes. These are encryption schemes that permit a restricted class of computation directly on encrypted data. Other mechanisms, such as secure hardware, also exist that allow some computation to be performed on encrypted data. These solutions are not general purpose, however, because they do not enable all types of operations to be performed on encrypted data. Therefore, users of platforms that employ these mechanisms must analyze their applications and decide whether it is possible to encrypt some part of their data while preserving application semantics. Making such a determination can be extraordinarily difficult as each data element referenced by an application may be subject to a complex set of constraints and dependencies that can limit the type of encryption that may be applied thereto. Moreover, inaccurate determinations in this regard can result in a failure to apply the strongest possible encryption to certain data elements as well as a failure of application logic due to an inability to perform certain operations on encrypted data.

A related system that addresses the problem of data security is CryptDB (See Raluca Ada Popa et al., "CryptDB: Protecting Confidentiality with Encrypted Query Processing," in Proceedings of the $23^{rd}$ ACM Symposium on Operating Systems Principles (SOSP), Cascais, Portugal, October 2011). Generally speaking, CryptDB is a database that uses PHE schemes to execute queries against encrypted data. CryptDB requires developers to specify the strongest encryption scheme that can be applied to each database column. In the absence of any such specification, CryptDB assumes that a column can be maintained in cleartext. For reasons discussed above, determining the strongest encryption scheme that can be applied to each database column can be extremely difficult to achieve and errors in this regard can result in under-secured columns as well as failures in application code that operates on encrypted columns.

SUMMARY

Systems, methods and computer program products are described herein that analyze the code of an application and, based on the analysis, identify whether data elements (e.g., columns) referenced by the code can be encrypted, and for those data elements that can be encrypted, recommend an encryption scheme. The recommended encryption scheme for a given data element may be the highest level of encryption that can be applied thereto without affecting the semantics of the application code. In conducting the analysis, embodiments described herein may take into account factors such as (1) the encryption schemes that are available; (2) whether any of the available encryptions scheme enable operations to be performed on encrypted data, and which operations are permitted; (3) whether operations performed on certain encrypted data elements can be deferred to a client external to a database server in accordance with a deferred evaluation scheme; (4) constraints that have been placed on data elements (e.g., by virtue of a type definition, by virtue of operations that are performed on the data elements, etc.); and (5) dependencies between data elements (e.g., dependencies that arise from a database schema or from the application code). The output generated based on the analysis may not only include a mapping of each data element to a recommended encryption scheme, but may also include an explanation of why each recommendation was made for each data element. Such explanation may include, for example, an identification of the application code that gave rise to the recommendation for each data element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 3:
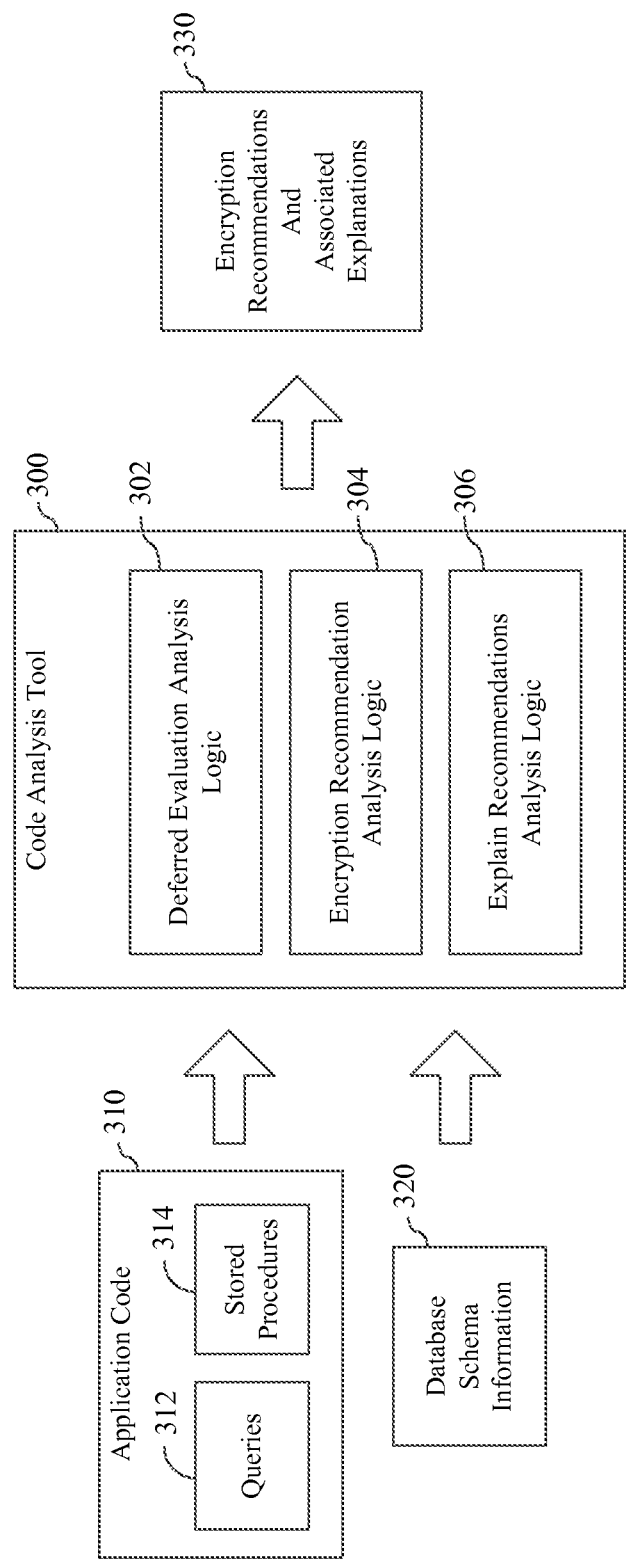

FIG. 3 is a block diagram of a code analysis tool in accordance with an embodiment that analyzes the code of an application and, based on the analysis, identifies data elements referenced by the application code, identifies whether such data elements can be encrypted, and also identifies the strongest encryption scheme that can be applied to such data elements without changing application semantics.

Figure 4:
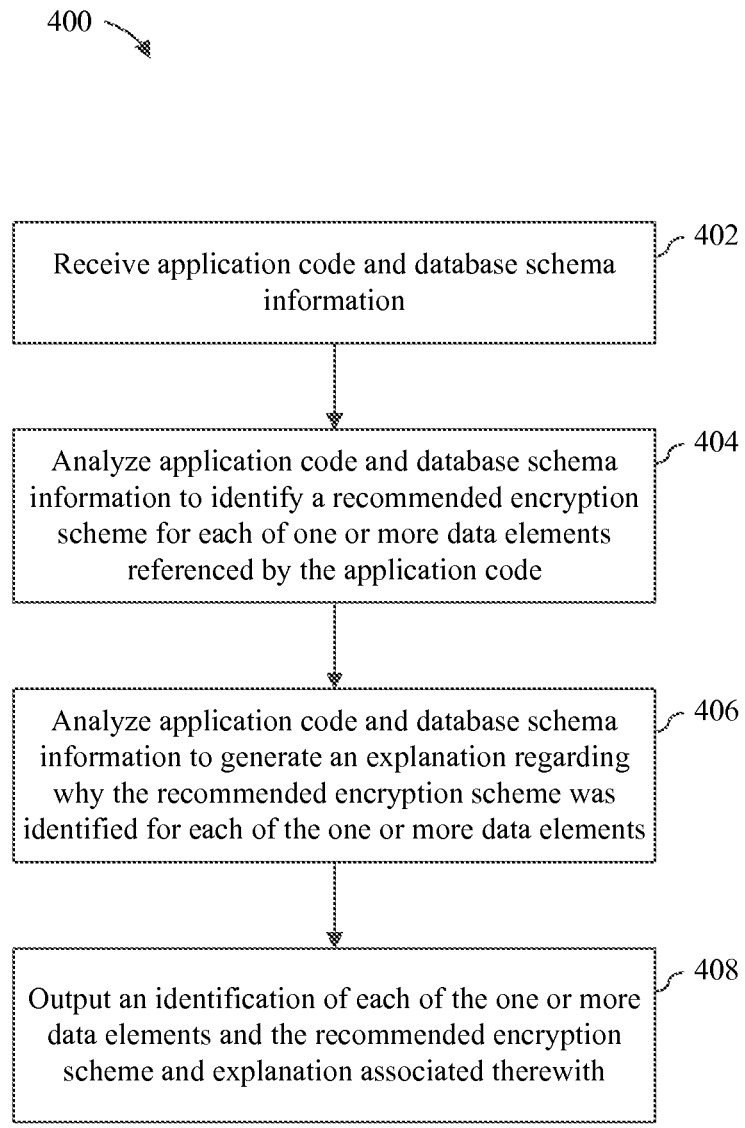

FIG. 4 depicts a flowchart of a method performed by a code analysis tool in accordance with an embodiment.

Figure 5:
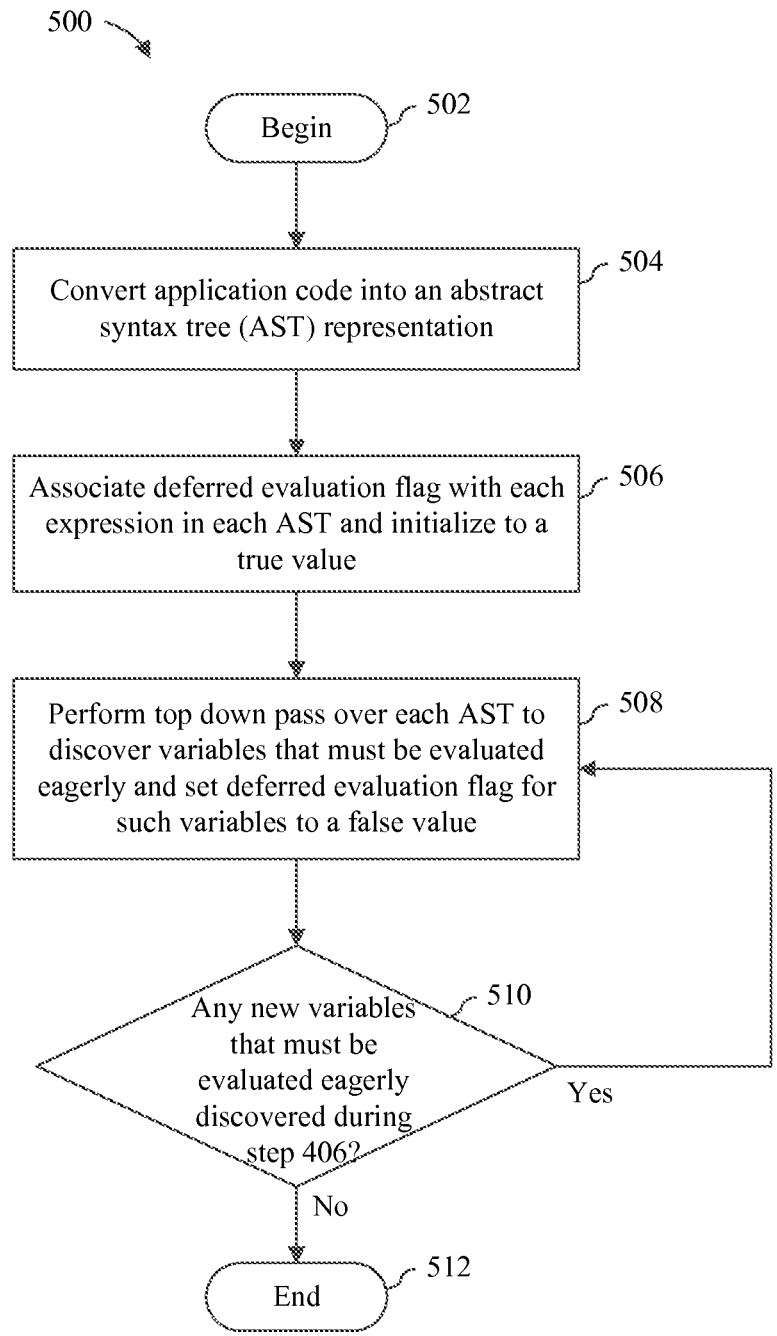

FIG. 5 depicts a flowchart of a method for performing a deferred evaluation analysis as part of generating encryption recommendations for an application in accordance with an embodiment.

Figure 6:
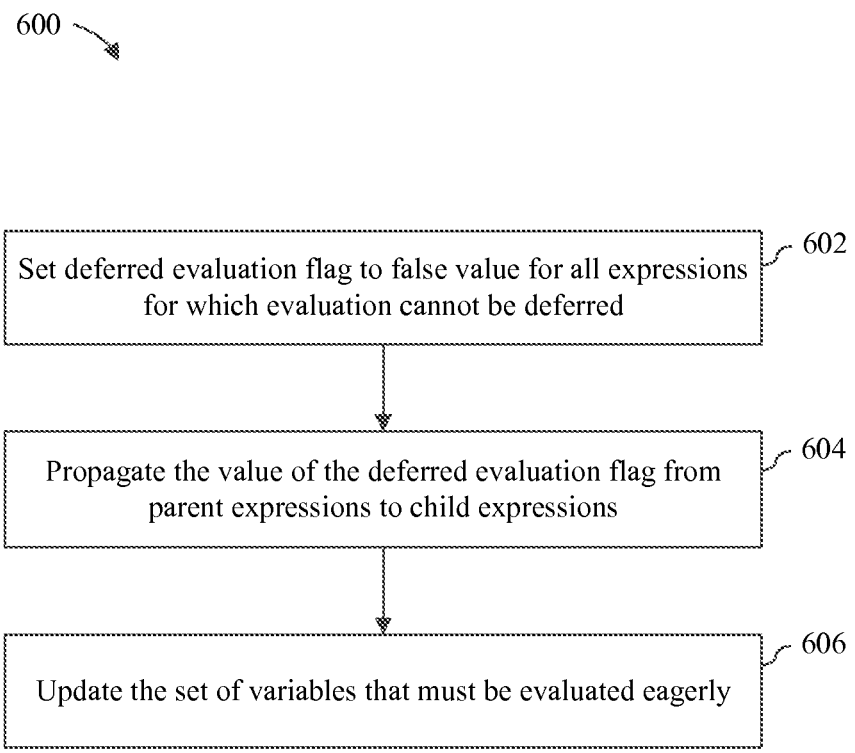

FIG. 6 depicts a flowchart of a method for performing a top down traversal of an abstract syntax tree (AST) as part of performing a deferred evaluation analysis in accordance with an embodiment.

Figure 7:
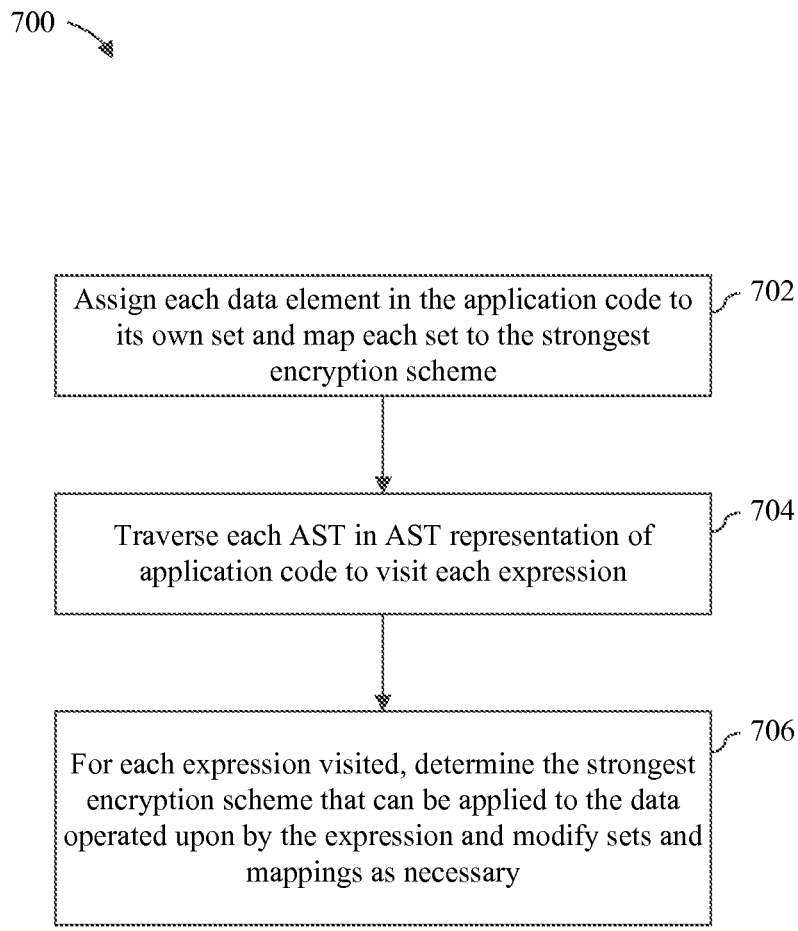

FIG. 7 depicts a flowchart of a method for performing an encryption recommendation analysis for an application in accordance with an embodiment.

Figure 8:
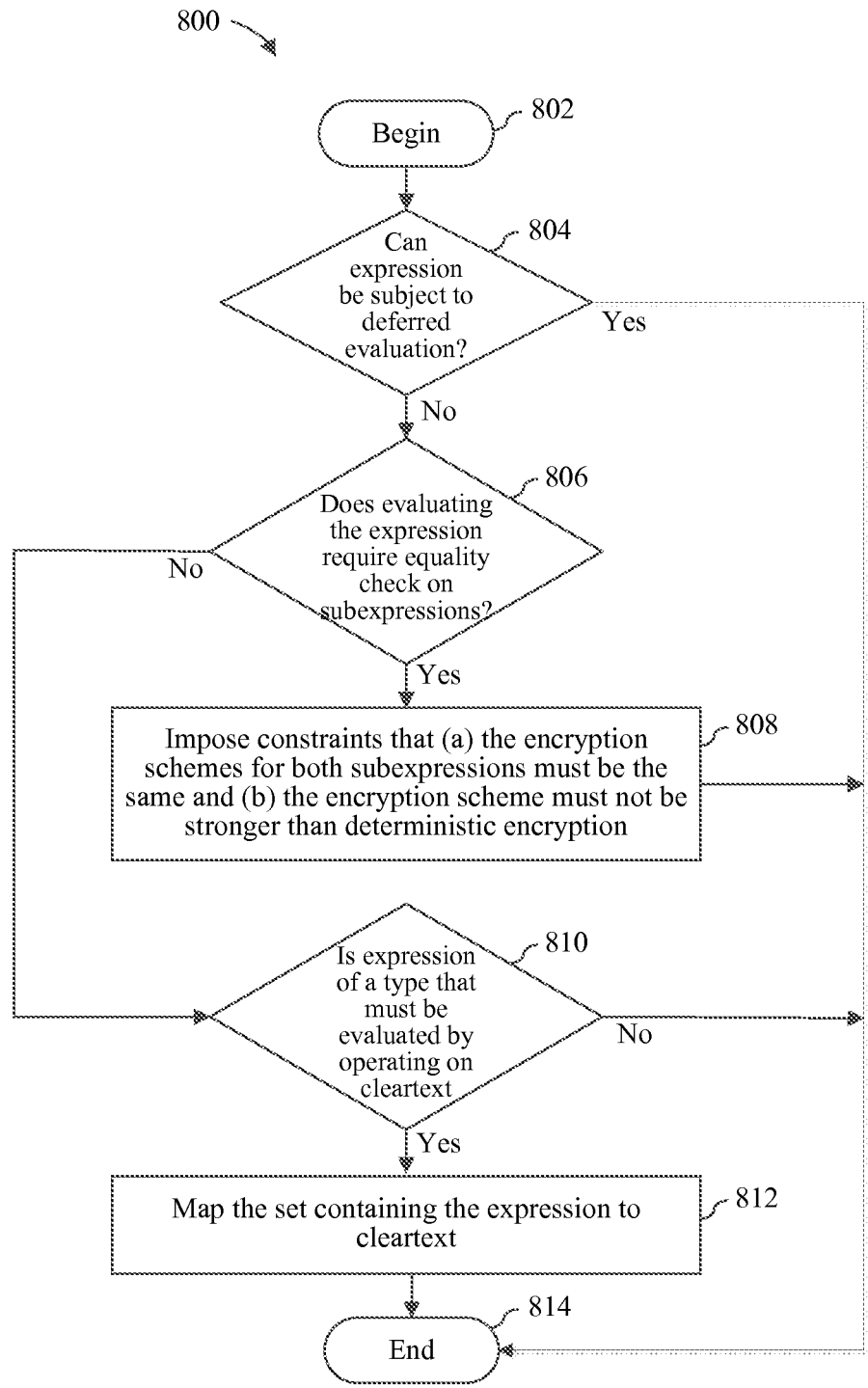

FIG. 8 depicts a flowchart of a method for determining a strongest encryption scheme that can be applied to an expression and modifying associated sets and mappings accordingly as part of performing an encryption recommendation analysis for an application in accordance with an embodiment.

Figure 9:
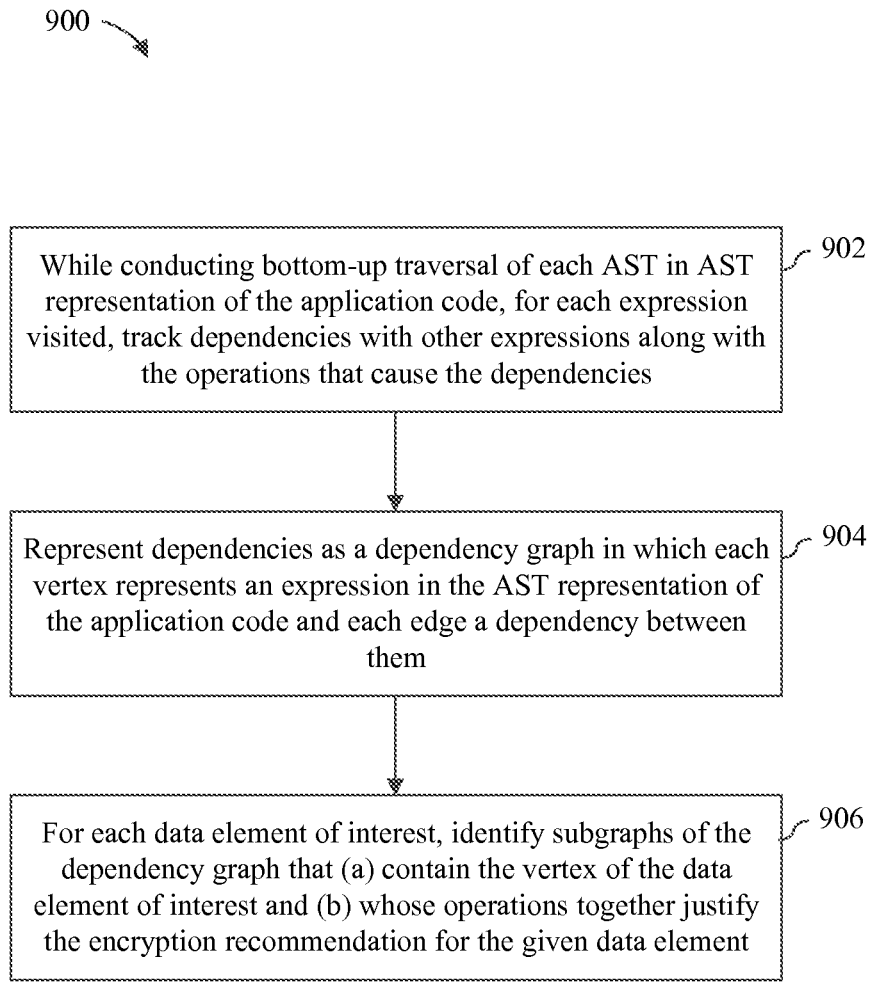

FIG. 9 depicts a flowchart of a method for performing an explain recommendations analysis to help explain encryption recommendations generated for an application in accordance with an embodiment.

Figure 10:
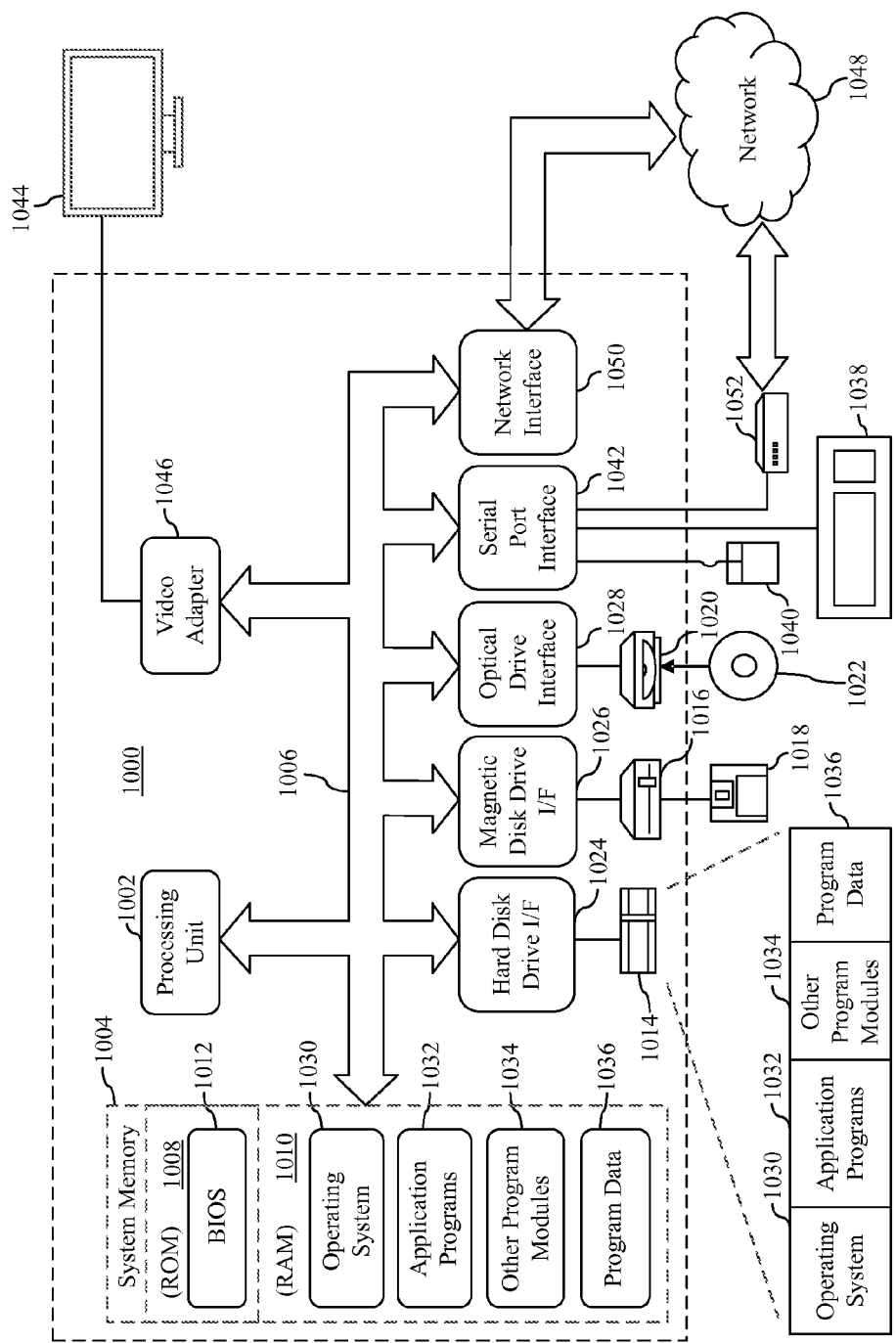

FIG. 10 is a block diagram of an example processor-based computer system that may be used to implement various embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Embodiments described herein relate to the use of encryption to protect digitally-stored data. For example, embodiments described herein relate to the use of encryption to protect data hosted on untrusted platforms. While many conventional encryption schemes preserve data confidentiality, such encryption schemes typically do not permit any computations to be performed on encrypted data. This significantly reduces the benefits of hosting applications on cloud platforms. As discussed in the Background Section above, one way of addressing this issue is to use partially homomorphic encryption (PHE) schemes that permit a restricted class of computation directly on encrypted data.

Figure 1:
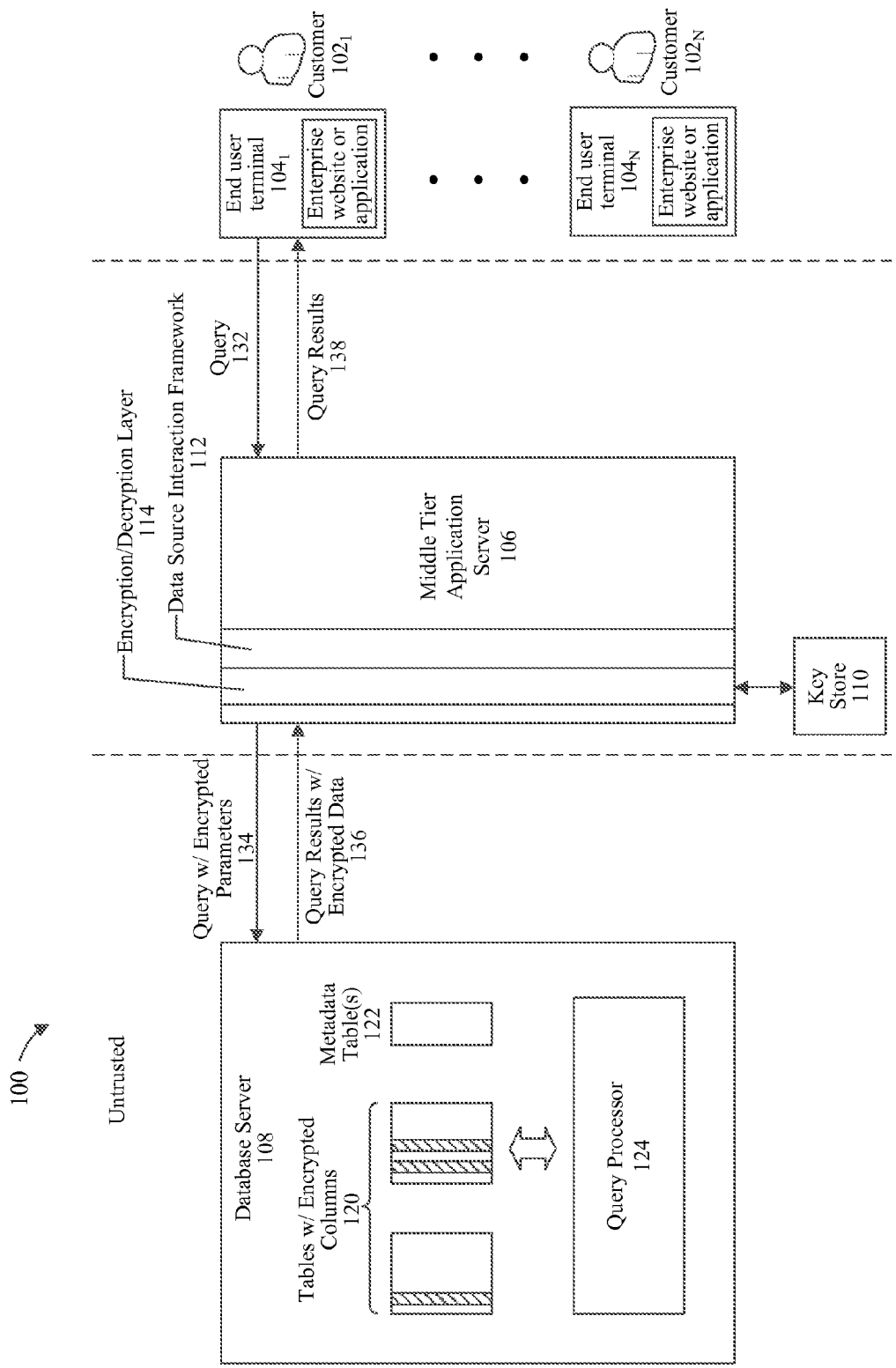
FIG. 1 is a block diagram of a system in which an untrusted data-hosting platform uses one or more partially homomorphic encryption (PHE) schemes to perform a restricted class of computation directly on encrypted data.

By way of example, FIG. 1 is a block diagram of a system 100 in which an untrusted platform uses one or more PHE schemes to perform a restricted class of computation directly on encrypted data. As shown in FIG. 1, system 100 includes multiple end user terminals $104_1$-$104_N$, each of which executes a corresponding instance of an enterprise website or application. Various customers $102_1$-$102_N$ may interact with these enterprise website or application instances to access customer-related data. For example, in one implementation of system 100, the enterprise comprises a bank and each of customers $102_1$-$102_N$ may interact with an instance of the bank's website or application to access his/her account data. The customer-related data is stored on an untrusted platform (e.g., a cloud platform) that includes a database server 108. In particular, the customer-related data is stored by database server 108 in tables 120 that include at least some encrypted columns. Database server 108 may comprise an instance of SQL SERVER®, published by Microsoft of Redmond, Wash.

Queries generated by the various instances of the enterprise website or application are routed via one or more networks to a middle tier application server 106. For example, customer $102_1$ may submit a request via an instance of the enterprise website or application executing on end user terminal $104_1$, thereby causing a query 132 to be generated. Query 132 is transmitted to a data source interaction framework 112 that is executing on middle tier application server 106. Data source interaction framework 112 may comprise a library of classes that can be used to interact with data sources such as databases and XML files. For example, data source interaction framework may comprise an ADO.NET client library published by Microsoft Corporation. It is noted that middle tier application server 106 shown in FIG. 1 is optional, and when it is not present, a separate instance of data source interaction framework 112 may instead be installed upon each of end user terminals $104_1$-$104_N$.

Data source interaction framework includes 112 an encryption/decryption layer 114 that analyzes query 132. If encryption/decryption layer 114 determines that query 132 includes parameters that correspond to encrypted columns in tables 120, then encryption/decryption layer 114 encrypts the parameter data using keys from a key store 110, thereby generating a query with encrypted parameters 134. Query with encrypted parameters 134 is sent to database server 108 via one or more networks.

At database server 108, a query processor 124 processes query with encrypted parameters 134, wherein such processing includes accessing relevant data, including any encrypted data, from tables 120. In certain cases, such processing includes leveraging one or more PHE schemes to perform computations directly upon encrypted data retrieved from tables 120. In this example, query processor 124 processes query with encrypted parameters 134 to produce query results with encrypted data 136. It is noted that in system 100, the encrypted data stored in columns 120 as well as the keys never appear in cleartext on database server 108. Database server 108 may store in one or more metadata tables 122 information such as the type of encryption, key identifier (ID), and encrypted key used on a per column basis.

Query results with encrypted data 136 is then sent back to data source interaction framework 112 on middle tier application server 106. Encryption/decryption layer 114 within data source interaction framework 112 decrypts the encrypted data included in query results with encrypted data 136 using the appropriate keys from key store 110, thereby generating query results 138. Middle tier application server 106 then returns query results 138 to customer 102$_1$ in the form of readable information (i.e. cleartext information). In particular, such query results 138 are returned to the instance of the enterprise website or application executing on end user terminal 104$_1$ for presentation thereby to customer 102$_1$.

As can be seen from the foregoing description, system 100 comprises an untrusted platform that utilizes one or more PHE schemes to perform certain computations directly on encrypted data. However, before an enterprise can utilize this platform to support an application, it must first determine whether it is possible to encrypt some part of the application data (e.g., some columns within tables 120) while preserving application semantics. Making such a determination can be extraordinarily difficult as each data element referenced by the application may be subject to a complex set of constraints and dependencies that can limit the type of encryption that may be applied thereto. Moreover, inaccurate determinations in this regard can result in a failure to apply the strongest possible encryption to certain data elements as well as a failure of application logic due to an inability to perform certain operations on encrypted data (e.g., queries may fail if query processor 124 is incapable of performing required computations on certain encrypted data).

Assuming that an enterprise can determine the highest degree of encryption that can be applied to each column, the enterprise can then make schema changes to columns that need to contain encrypted data, and in addition, encrypt sensitive data using their keys from a key store. Once this is done, the enterprise is ready to allow customer traffic.

Because encrypted data stored within tables 120 can only be manipulated in its encrypted form on database server 108, the type of database operations (e.g., SQL operations) that can be performed on the encrypted columns is restricted and dependent on the type of encryption used. For example, columns that are encrypted using a deterministic encryption scheme may be subject to operations such as equality, group by, and equality based joins but may not be subject to other operations such as concatenation, is null, truncate, and order by. This restriction can be eased if the computation that must be performed on the encrypted data can be postponed or "deferred" to a trusted client external to the database server, where the encryption keys reside. Such a "deferred evaluation" approach to query processing can enable a greater number of columns to be encrypted within tables 120. To enable deferred evaluation, intelligence must be added to database server 108 that can determine whether a given query can be satisfied by pushing some of the computation to the client side.

Figure 2:
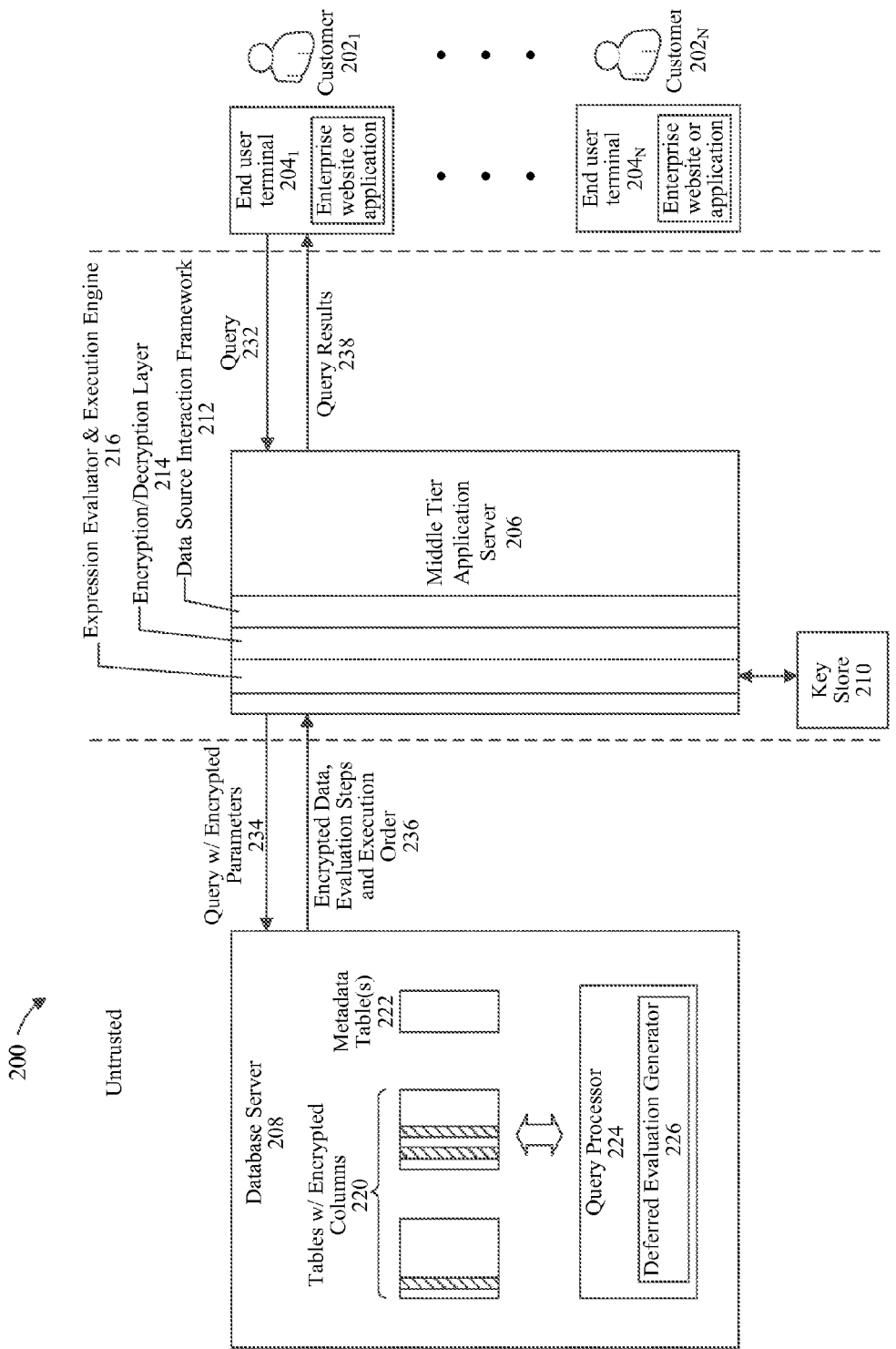
FIG. 2 is a block diagram of a system in which an untrusted data-hosting platform uses one or more PHE schemes to perform a restricted class of computation directly on encrypted data and also uses deferred evaluation to postpone at least some computations on encrypted data to a trusted client external to a database server.

FIG. 2 depicts an example system 200 in which an untrusted platform (a) uses one or more PHE schemes to perform a restricted class of computation directly on encrypted data and (b) also uses deferred evaluation to postpone at least some computations on encrypted data to a trusted client external to a database server. As shown in FIG. 2, system 200 has a similar architecture to system 100. In particular, system 200 includes multiple end user terminals 204$_1$-204$_N$, each of which executes a corresponding instance of an enterprise website or application. Various customers 202$_1$-202$_N$ may interact with these enterprise website or application instances to access customer-related data. The customer-related data is stored on an untrusted platform (e.g., a cloud platform) that includes a database server 208. In particular, the customer-related data is stored by database server 208 in tables 220 that include at least some encrypted columns.

Queries generated by the various instances of the enterprise website or application are routed via one or more networks to a middle tier application server 206. For example, customer 202$_1$ may submit a request via an instance of the enterprise website or application executing on end user terminal 204$_1$, thereby causing a query 232 to be generated. Query 232 is transmitted to a data source interaction framework 212 that is executing on middle tier application server 206. As was the case with system 100, middle tier application server 206 is optional. When it is not present, a separate instance of data source interaction framework 212 may instead be installed upon each of end user terminals 204$_1$-204$_N$.

Data source interaction framework 212 includes an encryption/decryption layer 214 that analyzes query 232. If encryption/decryption layer 214 determines that query 232 includes parameters that correspond to encrypted columns in tables 220, then encryption/decryption layer 214 encrypts the parameter data using keys from a key store 210, thereby generating a query with encrypted parameters 234. Query with encrypted parameters 234 is sent via one or more networks to database server 208.

At database server 208, a query processor 224 processes query with encrypted parameters 234, wherein such processing includes accessing relevant data, including any encrypted data, from tables 220. In certain cases, such processing includes leveraging one or more PHE schemes to perform computations directly upon encrypted data retrieved from tables 220. A deferred evaluation generator 226 within query processor 224 also operates to determine whether certain aspects of query processing that involve computations on encrypted data can be deferred or pushed to middle tier application server 206. In such a case, query processor 224 will send back to data source interaction framework 212 on middle tier application server 206 the encrypted data, the deferred evaluation steps, and the order for carrying out such steps, all of which are denoted in FIG. 2 by reference numeral 236.

Encryption/decryption layer 214 within data source interaction framework 212 decrypts the encrypted data using the appropriate keys from key store 210. Then, an expression evaluator and execution engine 216 within data source interaction framework 212 applies the deferred evaluation steps received from database server 208 to the decrypted data in the specified order to generate query results 238. Middle tier application server 206 then returns query results 238 to customer 202$_1$ in the form of readable information (i.e., cleartext information). In particular, such query results 238 are returned to the instance of the enterprise website or application executing on end user terminal 204$_1$ for presentation thereby to customer 202$_1$.

As can be seen from the foregoing description, system 200 comprises an untrusted platform that advantageously utilizes one or more PHE schemes to perform certain computations directly on encrypted data and also utilizes deferred evaluation to increase the number of database columns that may be encrypted. However, as was the case with system 100, before an enterprise can utilize this platform to support an application, it must first determine whether it is possible to encrypt some part of the application data while preserving application semantics. As was noted above in reference to system 100 making such a determination can be extraordinarily difficult as each data element referenced by the application may be subject to a complex set of constraints and dependencies that can limit the type of encryption that may be applied thereto. Furthermore, in making this determination with respect to system 200, the enterprise must also factor in that certain operations can be deferred to the client while other operations cannot, thereby increasing the complexity of the analysis and the possibility of error.

In the foregoing description of systems 100 and 200, reference is made to the use of PHE schemes to perform a limited set of computations directly upon encrypted data. As will be appreciated by persons skilled in the relevant art(s), other mechanisms, such as secure hardware, also exist that allow some computation to be performed on encrypted data. Like PHE, however, these solutions are typically not general purpose as they do not enable all types of operations to be performed on encrypted data. Thus, parties deploying an application to a platform that utilizes one of these alternative solutions will also be required to determine whether it is possible to encrypt some part of the application data while preserving application semantics.

Systems, methods and computer program products are described herein that address the foregoing issues. In particular, systems, methods and computer program products described herein analyze the code of an application and, based on the analysis, identify whether data elements (e.g., columns) referenced by the code can be encrypted, and for those data elements that can be encrypted, recommend an encryption scheme. The recommended encryption scheme for a given data element may represent the highest level of encryption that can be applied thereto without affecting the semantics of the application code. In conducting the analysis, embodiments described herein may take into account factors such as (1) the encryption schemes that are available; (2) whether any of the available encryptions scheme enable operations to be performed on encrypted data, and which operations are permitted; (3) whether operations performed on certain encrypted data elements can be deferred to a client external to a database server in accordance with a deferred evaluation scheme; (4) constraints that have been placed on data elements (e.g., by virtue of a type definition, by virtue of operations that are performed on the data elements, etc.); and (5) dependencies between data elements (e.g., dependencies that arise from a database schema or from the application code). The output generated based on the analysis may not only include a mapping of each data element to a recommended encryption scheme, but may also include an explanation of why each recommendation was made for each data element. Such explanation may include, for example, an identification of the application code that gave rise to the recommendation for each data element.

By automatically generating such recommendations, embodiments described herein can advantageously provide a developer or publisher of an application with an indication of which data elements can be encrypted and the highest degree of encryption that can be applied thereto without affecting program semantics prior to deploying the application on a platform that hosts encrypted data. Such data-hosting platform may comprise but is by no means limited to a data-hosting platform that can perform a restricted class of computation on encrypted data (e.g., the platform of system 100) or a data-hosting platform that can perform a restricted class of computation on encrypted data and that also supports deferred evaluation (e.g., the platform of system 200). Furthermore, since embodiments described herein can also identify the aspects of an application that give rise to a particular encryption scheme recommendation, such embodiments provide application developers and publishers with useful guidance on how best to modify an application in order to increase the level of encryption that can be applied to one or more data elements.

In the following sections, embodiments of the aforementioned systems, methods and computer program products will be more fully described. In particular, Section II describes systems, methods and computer program products that analyze application code and recommend encryption of data elements referenced therein based on such analysis, wherein the encryption recommendations do not affect program semantics. Section III describes an example processor-based computer system that may be used to implement various embodiments. Section IV describes some additional exemplary embodiments. Section V provides some concluding remarks.

II. Code Analysis for Recommending Encryption of Data without Affecting Program Semantics FIG. 3 is a block diagram of a code analysis tool 300 that can be used to guide application developers and publishers to select a security policy for protecting application data. In particular, the analysis performed by code analysis tool 300 identifies data elements referenced by application code, identifies whether such data elements can be encrypted, and also identifies the strongest encryption scheme that can be applied to such data elements without changing application semantics. As will be discussed herein, the analysis may also identify or explain why a data element has to be encrypted using a certain encryption scheme. For example, the analysis may identify certain expressions within the application's code that cannot be supported if data is encrypted using a type of encryption that is stronger than what is recommended.

The analysis performed by code analysis tool 300 can be used to greatly simplify the process of migrating an application to an untrusted data-hosting platform. For example, if the encryption level recommended by the analysis for a particular data element (e.g., for a particular column in a database table) is deemed strong enough, then the application developer or publisher can apply the recommended level of data encryption to that data element. Otherwise, the application developer or publisher can use the analysis to identify parts of their application that should be changed to allow more data elements to be encrypted. However, it is noted that the features of code analysis tool 300 are not limited to the analysis of applications to be deployed to an untrusted data-hosting platform and that the features described herein may be applied to other types of applications as well.

As shown in FIG. 3, the input to code analysis tool 300 includes application code 310 and databases schema information 320. In this particular example, application code 310 includes a number of queries 312 and a number of stored procedures 314. However this example is not intended to be limiting and other types of application code (e.g., source code) may be analyzed in accordance with the techniques described herein.

Queries 312 comprise queries generated by one or more instances of an application over one or more periods of time, and may also be referred to as a "workload." In one embodiment, queries 312 comprise SQL queries (e.g., queries expressed in a language like T-SQL), although this example is by no means limiting and any type of queries may make up queries 312. Queries 312 may be obtained in a variety of ways. For example, queries 312 may be captured during normal operation of one or more instances of an application at a client (e.g., at the machine(s) where the application instance(s) are executing) or at a server side (e.g., at the database server(s) where the queries are received for processing). Queries 312 may be captured over a time period that is sufficiently long enough to ensure that all, substantially all, or at least a majority of the types of queries that may be generated by an application are represented therein. Queries 312 may also be provided to code analysis tool 300 in a variety of ways. For example and without limitation, queries 312 may be provided as part of an electronic document (e.g., an XML document) or file.

Stored procedures 314 comprise procedures that can be called by the application by passing input and output parameters thereto. As will be appreciated by persons skilled in the art, each one of stored procedures 314 comprises a set of queries that operates to perform certain operations as a logical unit. Each of stored procedures 314 may be created by the application developer (e.g., by using the CREATE PROCEDURE command in SQL) and forms part of the database schema. Like queries 312, stored procedures 314 may also be provided to code analysis tool 300 in a variety of ways. For example and without limitation, stored procedures 314 may be provided as part of an electronic document (e.g., an XML document) or file.

Database schema information 320 comprises information concerning the logical organization or structure of the database to which queries 312 and stored procedures 314 are directed. Database schema information 320 may include, for example, and without limitation, a description of database tables, columns, views, relationships, indices, primary/foreign key constraints, and the like. Like queries 312 and stored procedures 314, database schema information 320 may be provided as part of an electronic document or file, or in some other manner.

Code analysis tool 300 analyzes application code 310 and database schema information 320 in a manner to be described herein, and based on such analysis, produces encryption recommendations and associated explanations 330. In the embodiment shown in FIG. 3, the analysis performed by code analysis tool 300 includes at least three components: a deferred evaluation analysis that is performed by deferred evaluation analysis logic 302, an encryption recommendation analysis that is performed by encryption recommendation analysis logic 304, and an explain recommendations analysis that is performed by explain recommendations analysis logic 306. Each of these components will be described in detail herein. Each of these components may be implemented in software, through the execution of instructions by one or more general purpose or special-purpose processors, in hardware using analog and/or digital circuits, or as a combination of software and hardware. Although each of these components are shown as being discrete entities in FIG. 3, it is to be understood that the logic associated with these components may be an integrated part of some larger component (e.g., where the components are implemented in software, the software instructions associated with each component may comprise part of the same source code, library, executable, etc.).

As noted above, code analysis tool 300 outputs encryption recommendations and associated explanations 330. Encryption recommendations and associated explanations 330 comprise an identification of one or more data elements referenced by application code 310 and, for each data element so identified, an indication of whether the data element can be encrypted and, for data elements that can be encrypted, a recommended highest level of encryption that may be applied thereto. The identified data elements may comprise, for example, columns in one or more database tables, although this example is not intended to be limiting and other types of data elements may be identified. The levels of encryption that may be applied may vary from implementation to implementation but may include, for example and without limitation, randomized encryption, deterministic encryption, or cleartext (i.e., no encryption). Encryption recommendations and associated explanations 330 may also include an indication that two or more data elements referenced by application code 310 have to be encrypted using the same encryption algorithm and the same encryption key.

Encryption recommendations and associated explanations 330 also comprise, for one or more of the data elements for which an encryption recommendation is provided, an explanation of why each data element should be encrypted using a particular encryption scheme. Such explanation may comprise an identification and/or location of one or more expressions included in application code 310 that cannot be supported if the data element were encrypted using a stronger encryption scheme than the recommended one.

Encryption recommendations and associated explanations 330 may be output in a variety of forms depending upon the implementation. For example, encryption recommendations and associated explanations 330 may be output in a form that is easily viewable by a user (e.g., a print format for viewing on paper or a display format for viewing on a display or on the Web), in a data format such as XML, or programmatically through a data-reading interface. Code analysis tool 300 may also act as a data provider for one or more other systems, analyzing application code 310 and database schema information 320 in the ways described herein, and then passing the results of such analysis to other components for further processing.

In one embodiment, code analysis tool 300 comprises a software program that can be installed on a computer (e.g., the processor-based computer system described below in Section III) and then executed in an offline mode. In an alternate embodiment, code analysis tool 300 comprises a software program that is executed on a server computer such that the features thereof are accessible to one or more client computers that are connected thereto via one or more networks (e.g., the Internet). In accordance with the latter embodiment, a user of code analysis tool 300 may provide inputs to code analysis tool 300 and/or receive outputs therefrom via the aforementioned network(s). Code analysis tool 300 may also utilize other means for obtaining inputs. For example, in an embodiment, code analysis tool 300 may capture queries 312 as they are passed to or processed by a database server. As another example, code analysis tool 300 may obtain stored procedures 314 and/or database schema information 320 by accessing a database directly (e.g., via database connection information maintained by a database server or provided by a user). Still other methods for obtaining inputs may be used.

In an embodiment, code analysis tool 300 comprises a standalone software tool. In an alternate embodiment, code analysis tool 300 comprises part of a set of software tools that is incorporated into a particular software product or platform. For example, code analysis tool 300 may comprise one of a set of tools that is incorporated into a version of SQL SERVER®, published by Microsoft Corporation (e.g., as part of SQL SERVER® Management Studio). In accordance with such an embodiment, the features of code analysis tool 300 may be accessed via one or more graphical user interfaces (GUIs) that are provided as part of the particular software product or platform. For example, such GUIs may include a GUI by which a user can provide application code 310 and/or database schema information 320 or a GUI by which a user can specify a means for accessing such inputs (e.g., a database connection), as well as a GUI for displaying or otherwise providing outputs (e.g., encryption recommendations and associated explanations 330).

FIG. 4 depicts a flowchart 400 that further illustrates the general manner of operation of code analysis tool 300. The method of flowchart 400 is described herein by way of illustration only and is not intended to be limiting. As shown in FIG. 4, the method of flowchart 400 begins at step 402, in which code analysis tool 300 receives as input application code 310 and database schema information 320.

At step 404, code analysis tool 300 analyzes application code 310 and database schema information 320 to identify a recommended encryption scheme for each of one or more data elements (e.g., one or more columns) referenced by the application code.

At step 406, code analysis tool 300 further analyzes application code 310 and database schema information 320 to generate an explanation regarding why the recommended encryption scheme was identified for each of the one or more data elements.

At step 408, code analysis tool 300 outputs an identification of each of the one or more data elements and the recommended encryption scheme and explanation associated with each of the one or more data elements. Such output may comprise, for example, encryption recommendations and associated explanations 330.

The first three of the following four sub-sections describe the manner of operation of deferred evaluation analysis logic 302, encryption recommendation analysis logic 304 and explain recommendations analysis logic 306, respectively. In these three sub-sections, the various analyses are sometimes described in the context of a database that supports column level encryption. However, the analyses are not limited to this context and may be used in other contexts as well. Also, in these three sub-sections, it is assumed that the application of interest consists of a set of queries and stored procedures. However, this example is not intended to be limiting, and the analyses described herein may operate on other types of application code.

It is noted that, in certain alternate embodiments, one or more of deferred evaluation analysis logic 302 and explain recommendations analysis logic 306 may be disabled or may not be included within code analysis tool 300. For example, if code analysis tool 300 is applied to an application prior to the deployment thereof to an untrusted platform that does not support deferred evaluation, then there is essentially no need to perform deferred evaluation analysis. Thus, this analysis may be disabled or the logic for performing such an analysis may be removed entirely. Also, there may be implementations or scenarios in which it is not desired to provide explanations for the encryption recommendations. In such a case, the explain recommendations analysis may be disabled or the logic for performing such an analysis may be removed entirely.

A. Deferred Evaluation Analysis

Deferred evaluation analysis is performed by deferred evaluation analysis logic 302. Deferred evaluation analysis identifies expressions within application code 310 that can be deferred to a client by a database server (e.g., by database server 208 that supports deferred evaluation).

The basic premise of deferred evaluation is to delay the evaluation of an expression until the result of the evaluation is required. Often, when an expression is evaluated, it reduces to a primitive value (like integers and strings). In some situations, evaluating an expression may not be possible because certain inputs to the expression are not yet available. This may occur, for example, when the input values are being read across a network, when they are being computed in a different thread, or when they are encrypted and encryption keys are not available. In each of these cases, it is often desired that a runtime "continue" evaluation even without these input values as much as possible, and then "plug in" the values when they become available (e.g., when the network read completes, another thread completes, or when encryption keys become available).

By way of illustration, consider a table called Customer with a column called Name. Assume the table looks like this:

| Name |
|---|
| Alice |
| Bob |

Also consider the expression SELECT '<Customer Name='+Name+'>' FROM Customer. Ordinarily, when applied to the foregoing table, this query would return:

| Column |
|---|
| <Customer Name = Alice> |
| <Customer Name = Bob> |

Let us now assume that the column Name in the table Customer is encrypted. Then the table Customer may look like:

| Name |
|---|
| 0x2432fea324cd |
| 0x64ace45824de |

If the database server does not have the necessary encryption keys, then it cannot correctly evaluate the above query.

A database server that is configured to perform deferred evaluation can return the following result set to the client:

| Name |
|---|
| (+, '<Customer Name =', (+,0x2432fea324cd, '>') |
| (+, '<Customer Name =', (+,0x64ace45824de, '>') |

Each cell in this result set is essentially a "deferred evaluation expression" that comprises one or more primitive values, one or more operators and at least one encrypted value. A client that has access to the relevant encryption keys can now decrypt the encrypted values and generate the correct result.

In theory, it is possible to defer the evaluation of all kinds of expressions to the client. However, it is often not desirable to defer the evaluation of certain operations for various reasons (e.g., performance, latency, etc.). For example, deferring the evaluation of compute and/or data intensive operations such as joins, filters, sorting, or the like, can result in poor performance because inputs to these operations must be transmitted to the client, and additional resources must be provisioned on the client to perform these operations. Therefore, a query processor at a database server may restrict deferred evaluation to certain kinds or classes of simple expressions only. For example, in certain platforms, deferred evaluation may be restricted to scalar expressions only—i.e., to computations over scalar values, as opposed to relational operations such as joins and filters.

Expressions with side effects (e.g., inserts, deletes and updates) may not be considered good candidates for deferred evaluation as these expressions modify the database tables. Thus, such expressions may be most efficiently handled by the database server. However, it is even possible to defer evaluation of these expressions. For example, a database server could potentially store the deferred expression in a table (e.g., for an INSERT) and then evaluate it when the expression is retrieved by a future SELECT operation.

As was previously noted, a platform that supports deferred evaluation can typically support encryption of a larger number of columns because it is no longer restricted by the capabilities of the available encryption scheme(s). In other words, since deferred evaluation enables more operations to be performed on encrypted data, more data can be encrypted. But given that deferred evaluation itself may have its own set of restrictions (e.g., deferring evaluation of scalar expressions only), application developers and publishers will still require guidance as to what data elements (e.g., columns) can be encrypted so that the application workload runs correctly. Accordingly, the analysis performed by deferred evaluation analysis logic 302 ensures that the encryption recommendations provided by code analysis tool 300 takes into account the fact that the evaluation of certain expressions within application code 310 can be deferred to the client.

An exemplary method by which deferred evaluation analysis logic 302 performs deferred evaluation analysis will now be described in reference to flowchart 500 of FIG. 5. The method of flowchart 500 is described herein by way of illustration only. Other methods, including variations of the method of flowchart 500, may be used to identify expressions within application code 310 that can be deferred to a client by a database server. For the sake of illustration, the method of flowchart 500 will now be described with continued reference to code analysis tool 300 of FIG. 3. However, the method is not limited to that embodiment.

As shown in FIG. 5, the method of flowchart 500 begins at step 502, after which control flows to step 504. At step 504, deferred evaluation analysis logic 302 converts the components of application code 310 into an abstract syntax tree (AST) representation. For example, deferred evaluation analysis logic 302 may convert each query within queries 312 into its own AST and may convert each query within stored procedures 314 into its own AST.

At step 506, deferred evaluation analysis logic 302 associates a deferred evaluation flag (in one example, the flag "IsDeferred") with each expression in each AST. Each deferred evaluation flag indicates whether the expression associated therewith can be deferred to a client by a database server. Initially, the analysis assumes that all expressions can be deferred to the client, which is indicated by setting the value of the deferred evaluation flag to a true value (e.g., "true") for all expressions.

At step 508, deferred evaluation analysis logic 302 performs a top down pass over each of the ASTs to discover new variables that must be evaluated eagerly (i.e., to identify variables that cannot be evaluated via deferred evaluation) and to set the deferred evaluation flag to a false value (e.g., "false") for each such variable. One manner of performing step 508 will be described below in reference to flowchart 600 of FIG. 6.

At decision step 510, deferred evaluation analysis logic 302 determines whether any new variables that must be evaluated eagerly were discovered during the preceding iteration of step 508. If deferred evaluation logic 302 determines that at least one new variable that must be evaluated eagerly was discovered during the preceding iteration of step 508, then deferred evaluation analysis logic 302 will perform another iteration of step 508. However, if deferred evaluation analysis logic 302 determines that no new variables that must be evaluated eagerly were discovered during the preceding iteration of step 508, then the deferred evaluation analysis concludes as shown at step 512. The results of the analysis includes the value of the deferred evaluation flag for every expression in every AST of application code 310.

Flowchart 600 depicts one method of performing the top down traversal of each AST in step 508 of flowchart 500 in accordance with an example embodiment. As shown in FIG. 6, the method of flowchart 600 begins at step 602 in which deferred evaluation analysis logic 302 sets the deferred evaluation flags for all expressions in the AST for which evaluation cannot be deferred to a false value. Which expressions cannot be subject to deferred evaluation will vary depending upon the runtime. For example, consider a hypothetical runtime that supports deferred evaluation for addition and subtraction but not for multiplication. Now consider the expressions:

$$x=(a+b)-c; \text{ and}$$

$$y=(a+b)*c.$$

Clearly, the evaluation of the first expression can be deferred but the evaluation of the second expression cannot.

In embodiments, deferred evaluation analysis logic 302 sets the deferred evaluation flag to the false value for one or more of the following expression types: all expressions that have side effects (e.g., insert/delete/update statements); expressions that are deemed too expensive to push to the client (e.g., filters, joins, etc.); control flow statements (e.g., if, while, etc.); and expressions that assign to variables that must be evaluated eagerly. However this is only an example, and in alternate embodiments, one or more of these expression types may be candidates for deferred evaluation.

At step 604, deferred evaluation analysis logic 302 propagates the value of the deferred evaluation flag from each parent expression to each child expression in the AST. If a parent of an expression cannot be subject to deferred evaluation, then the child cannot be subject to deferred evaluation either. Thus, this propagation involves propagating the value of the deferred evaluation flag from parent expressions having a deferred evaluation flag with the false value to child expressions having a deferred evaluation flag with the true value. Note that this propagation is monotonic in that once the deferred evaluation flag is set to the false value for an expression (either through propagation from the parent or because the expression itself cannot be subject to deferred evaluation as determined during step 502), then it can never be set to the true value again.

At step 606, deferred evaluation analysis logic 302 updates a set of variables that must be evaluated eagerly based on the results of steps 602 and 604. As discussed above in reference to flowchart 500, if newly-discovered variables are added to this set then another iteration of step 508 (e.g., the method of flowchart 600) is performed. This technique of conducting multiple iterations of the ASTs is performed at least in part because different ASTs may include the same variable and, if it is determined while traversing one AST that a particular variable must be evaluated eagerly, then that determination must be taken into consideration when traversing other ASTs that include the same particular variable.

B. Encryption Recommendation Analysis

Encryption recommendation analysis is performed by encryption recommendation analysis logic 304. For each of one or more data elements referenced by application code 310, the encryption recommendation analysis produces an indication of whether the data element can be encrypted, and if the data element can be encrypted, a recommended encryption scheme. The recommended encryption scheme for a particular data element may comprise the strongest level of encryption that can be applied to that data element without altering the application code. As used herein, the term encryption scheme refers to one or more of an encryption algorithm (e.g. AES), an encryption type (randomized, deterministic, etc.), and the keys used to encrypt a certain data element (e.g., an expression, column, etc.).

In one embodiment, the encryption recommendation analysis uses the output of the analysis performed by deferred evaluation analysis 302 to generate recommendations. As noted above, such output may include a flag or other indicator associated with each expression in application code 310 that indicates whether the expression can be subject to deferred evaluation or not. However, in certain alternate embodiments (e.g., in embodiments in which deferred evaluation analysis logic 302 is disabled or not present), the encryption recommendation analysis need not take into account this deferred evaluation information.

In one particular embodiment, the encryption recommendation analysis generates encryption recommendations for data elements in accordance with the following rules:

| Recommended Encryption Scheme | Data Elements to which Recommended Encryption Scheme is Applied |
|---|---|
| Randomized encryption | Data elements that are either not involved in any operations, or for which all operations thereon can be subject to deferred evaluation |
| Deterministic encryption | Data elements that are involved in operations that rely on equality checks (e.g., filters, equi-joins, etc.) and all other operations thereon can be subject to deferred evaluation<br>Note that two data elements (e.g., columns) involved in an equi-join should be deterministically encrypted using the same encryption key |
| NULL-preserving encryption | Data elements that are involved in operations such as ISNULL |
| Cleartext | All other data elements other than those accounted for above |

However, this is only one example, and the encryption schemes that may be recommended for application to different data elements may vary from implementation to implementation.

A description of one method by which encryption recommendation analysis logic 304 may perform encryption recommendation analysis will now be described in reference to flowchart 700 of FIG. 7. The method of flowchart 700 is described herein by way of illustration only. Other methods, including variations of the method of flowchart 700, may be used to generate encryption recommendations for data elements within application code 310. For the sake of illustration, the method of flowchart 700 will now be described with continued reference to code analysis tool 300 of FIG. 3. However, the method is not limited to that embodiment.

In accordance with the method of flowchart 700, encryption recommendation analysis logic 304 maintains a map from sets of expressions in application code 310 to the strongest encryption scheme that can be applied to those expressions. During step 702, by way of initialization, encryption recommendation analysis logic 304 assigns each data element (e.g., each column and variable) in application code 310 to its own set and maps each of those sets to the strongest encryption scheme available.

During step 704, encryption recommendation analysis logic 304 performs a bottom-up traversal of each AST in an AST representation of application code 310 to visit each expression included therein.

At step 706, for each expression visited, encryption recommendation analysis logic 304 determines the strongest encryption scheme that can be applied to the data upon which the expression operates. This determination may be made based on whether or not the expression can be subject to deferred evaluation, based on constraints associated with expression (e.g., certain expressions can operate on certain types of encrypted data while other expressions cannot), as well as upon other factors. Based on the outcome of this determination, encryption recommendation analysis logic 304 modifies the existing sets and mappings as necessary.

One exemplary method of performing step 706 of flowchart 700 for each expression being visited will now be described in reference to flowchart 800 of FIG. 8. In accordance with this example, encryption recommendation analysis logic 304 can recommend or select one of three levels of encryption from a predefined set of encryption schemes for each data element in application code 310. These levels of encryption, from strongest to weakest, are: randomized encryption, deterministic encryption, and cleartext (i.e., no encryption). However, this is only an example, and persons skilled in the relevant art(s) will appreciate that in other implementations, recommendations may be based on different sets of encryption schemes.

As shown in FIG. 8, the method of flowchart 800 begins at step 802, after which control flows to decision step 804. At decision step 804, encryption recommendation analysis logic 304 determines if the expression being visited can be subject to deferred evaluation. This step may entail, for example, inspecting a deferred evaluation flag that was associated with the expression by deferred evaluation analysis logic 302. In further accordance with this example, if the deferred evaluation flag is equal to a true value (e.g., "true"), then the expression can be subject to deferred evaluation and if the deferred evaluation flag is equal to a false value (e.g., "false"), then the expression cannot be subject to deferred evaluation.

If encryption recommendation analysis logic 304 determines that the expression being visited can be subject to deferred evaluation, then no changes are made to the mapping for the set that contains the expression and the method concludes at step 814 (after which another expression may be visited if the bottom-up traversal of each of the application code ASTs has not concluded). However, if encryption recommendation analysis logic 304 determines that the expression being visited cannot be subject to deferred evaluation, the control flows to decision step 806.

At decision step 806, encryption recommendation analysis logic 304 determines if evaluating the expression being visited requires an equality check on any sub-expressions thereof. If encryption recommendation analysis logic 304 determines that evaluating the expression being visited requires an equality check on any sub-expressions thereof, then as shown at step 808, encryption recommendation analysis logic 304 imposes the constraint that the encryption scheme for both subexpressions must be the same and the encryption scheme must not be stronger than deterministic encryption, after which the method concludes at step 814.

However, if encryption recommendation analysis logic 304 determines during decision step 806 that the expression being visited cannot be evaluated if both sub-expressions thereof are deterministically encrypted, the control flows to decision step 810.

At decision step 810, encryption recommendation analysis logic 304 determines if the expression being visited is of a type that must be evaluated by operating on cleartext. If encryption recommendation analysis logic 304 determines that the expression being visited is not of a type that must be evaluated by operating on cleartext, then the method concludes at step 814.

However, if encryption recommendation analysis logic 304 determines during decision step 810 that the expression being visited is of a type that must be evaluated by operating on cleartext, then encryption recommendation analysis logic 304 maps the set containing the expression to cleartext as shown at step 812, after which the method concludes at step 814.

A pseudo-code representation of one implementation of the foregoing method of encryption recommendation analysis is shown below:

As can be seen in the foregoing pseudo-code, the analysis maintains a map (ExpressionEncMap) from sets of expressions in the application to the strongest encryption scheme. Initially, each column and variable in the application belongs to its own set and is mapped to the strongest encryption scheme (in this case, RandomizedEncryption). The analysis also maintains a disjoint set of expressions (Expression Set). Disjoint sets support three operations, MakeSet(v), Find(v) and Union(v1,v2). MakeSet(v) creates a new set with just one element v. Find(v) returns a value which represents the set containing the value v. Union(v1,v2) finds the sets which contain values v1 and v2 respectively, and replaces them with a union of both sets. The analysis visits every expression in each AST of the application.

If the expression can be deferred to the client (as indicated by the IsDeferred flag), no changes are made to ExpressionEncMap. If the expression cannot be deferred, then the analysis checks if the expression can be evaluated if both sub-expressions are deterministically encrypted. In this case, the analysis computes a union of the sets containing both sub-expressions and maps the resulting set to an encryption scheme that is at least as weak as deterministic encryption. If this is not the case, then the analysis checks if the expression must be evaluated on clear text data. In this case, the analysis maps the set containing the expression to ClearText.

Further illustration of the manner of operation of encryption recommendation analysis logic 304 will now be provided with respect to an example database table and example queries. Imagine a user having a table named "Employee" with the following columns and associated data types: "FirstName CHAR(100)", "LastName CHAR(100)", "SSN CHAR (10)", "Base_Salary INT", and "Annual_Bonus INT."

Now, further imagine that the user has a workload that is executing (for simplicity) the following two sets of queries:

```
Input:
  1. T-SQL Script s
Types:
  1. EncryptionScheme \in { RandomizedEncryption, DeterministicEncryption,
     ClearText }
  2. Join : EncryptionScheme x EncryptionScheme -> EncryptionScheme
State:
  1. DisjointSet<Expression> ExpressionSet /* a union find data structure */
  2. Dictionary<Expression, EncryptionScheme> ExpressionEncMap
Main
  1. For each column and variable v
     a. MakeSet(ExpressionSet, v); //Create a new set with one value v
     b. ExpressionEncMap[v] = RandomizedEncryption
  2. Traverse AST(s) in pre-order, call Visit(e) for each expression
Visit(Expression expr)
  1. if !IsDeferred(e)
     a. if expr of the form v1 = v2
           /* v1 and v2 must be encrypted using the same scheme, and the
              encryption scheme cannot be stronger than
              DeterministicEncryption */
           i.   e1 = ExpressionEncMap[ExpressionSet.Find(v1)]
           ii.  e2 = ExpressionEncMap[ExpressionSet.Find(v2)]
           iii. e = Join(Join(e1, e2), DeterministicEncryption)
           iv.  Union(ExpressionSet, v1, v2)
           v.   ExpressionEncMap[ExpressionSet.Find(v1)] = e
        else if MustEvaluateInClearText(expr)
           /* e must be in cleartext */
           i.   ExpressionEncMap[ExpressionSet.Find(expr)] = ClearText
```

```
Query Set 1:
SELECT FirstName + LastName FROM Employee WHERE SSN=@SSN
Query Set 2:
DECLARE @base_salary int
DECLARE @annual_bonus int
SELECT @base_salary = Base_Salary FROM Employee
SELECT @ annual_bonus = Annual_Bonus FROM Employee
SELECT @base_salary+@annual_bonus
where @base_salary and @annual_bonus are local variables.
```

Now imagine that there are three possible encryption schemes that can be applied to data: randomized encryption, deterministic encryption, and additive encryption. Each of these encryption schemes is limited in terms of the types of operations that can performed on data encrypted using that scheme. If the encryption scheme is randomized encryption, then no operations can be performed on the encrypted data apart from storing and retrieving the data. If the encryption scheme is deterministic encryption, then apart from storing and retrieving the encrypted data, only equality operations can be performed on the encrypted data. If the encryption scheme is additive encryption, then apart from storing and retrieving the encrypted data, only INTEGER additions can be performed on the encrypted data. Data can also be represented in cleartext, which supports all operations but does not encrypt the data.

The input to encryption recommendation analysis logic 304 in this case will include at least the database schema information (e.g., the tables, columns and their data types) and the user workload (e.g., all the queries and stored procedures that will run in the database).

Encryption recommendation analysis logic 304 will analyze the query sets and identify constraints and dependencies between data elements. For Query Set 1, the constraints are:
FirstName must support string concatenation
LastName must support string concatenation
SSN must support Equality
For Query Set 1, the dependencies are:
FirstName and LastName must have the same encryption scheme and key
SSN and @SSN must have the same encryption scheme and key
For Query Set 2, the constraints are:
@base_salary and @annual_bonus must support INTEGER addition
For Query Set 2, the dependencies are:
@base_salary must have the same encryption scheme and key as the column Base_Salary
@annual_bonus must have the same encryption scheme and key as the column Annual_Bonus
@base_salary and @annual_bonus must have the same encryption scheme.

Once encryption recommendation analysis logic 304 has collected all the above information coming from the user workload, it will operate to identify a solution that satisfies all of the above requirements. This may be achieved using an analysis such as the one described above in reference to FIGS. 7 and 8.

In accordance with such an analysis, encryption recommendation analysis logic 304 adds all the expressions that have dependencies with each other to the same set. Encryption recommendation analysis logic 304 maps each set to a corresponding encryption scheme that satisfies the requirements analyzed to this point. Encryption recommendation analysis logic 304 starts with no sets and creates sets as new expressions are found. Encryption recommendation analysis logic 304 initially maps each new set to the strongest encryption scheme possible.

In accordance with the example set forth above, encryption recommendation analysis logic 304 begins processing the constraints and dependencies. For Query Set 1, encryption recommendation analysis logic 304 creates a set for FirstName and maps it to the strongest encryption scheme (i.e., randomized encryption). Encryption recommendation analysis logic 304 then applies the constraint that FirstName must support string concatenation and given that there is no encryption scheme that supports string concatenation, encryption recommendation analysis logic 304 downgrades the recommended encryption scheme to cleartext.

Encryption recommendation analysis logic 304 also creates a set for LastName and maps it to the strongest encryption scheme (i.e., randomized encryption). Encryption recommendation analysis logic 304 then applies the constraint that LastName must support string concatenation and given that there is no encryption scheme that supports string concatenation, encryption recommendation analysis logic 304 downgrades the recommended encryption scheme for the set to cleartext.

Encryption recommendation analysis logic 304 further creates a set for SSN and maps it to the strongest encryption scheme (i.e. randomized encryption). Encryption recommendation analysis logic 304 then applies the constraint that SSN must support equality, and based on this constraint, downgrades the recommended encryption scheme for the set to deterministic. Encryption recommendation analysis logic 304 also adds @SSN to the set that includes SSN.

With respect to Query Set 2, encryption recommendation analysis logic 304 creates a set for Base_Salary and maps it to the strongest encryption scheme (i.e. randomized encryption). Encryption recommendation analysis logic 304 also adds @base_salary to the set that includes Base_Salary.

Encryption recommendation analysis logic 304 also creates a set for Annual_Bonus and maps it to the strongest encryption scheme (i.e. randomized encryption). Encryption recommendation analysis logic 304 also adds @annual_bonus to the set that includes Annual_Bonus.

Since there is an addition, encryption recommendation analysis logic 304 concatenates the sets that include @annual_bonus and @base_salary and downgrades the encryption scheme for the resulting set to additive so as to support the addition.

Since additional queries may impose additional constraints, it is possible that if another query required equality on Base_Salary, then the set that contains Base_Salary (which up to now has been {Base_Salary, @base_salary, Annual_Bonus, @annual_Bonus}) would be required to support equality. However, since equality and addition cannot both be supported using a single encryption scheme, encryption recommendation analysis logic 304 would be required to downgrade the set to cleartext.

In an embodiment, the output of the encryption recommendation analysis comprises an identification of each of a plurality of data elements (e.g., columns) referenced by application code 310 and an indication of whether each data element can be encrypted. If a data element can be encrypted, the output may also include a recommended encryption scheme for the data element. The recommended encryption scheme may comprise the highest level of encryption that can be applied to the data element without changing program semantics. In certain instances, an indication that two or more data elements have to be encrypted using the same encryption algorithm and the same key may also be provided.

C. Explain Recommendations Analysis

In addition to making encryption recommendations, it may be deemed important to educate users about why code analysis tool 300 makes a certain encryption recommendation for a certain data element. For example, if code analysis tool 300 recommends that a column cannot be encrypted, it may be useful to also provide a reason why the column cannot be encrypted. This information can help application developers and publishers identify parts of code that need to be refactored, so that a data element can be encrypted using a stronger form of encryption. To this end, explain recommendations analysis logic 306 extends the analysis performed by encryption recommendation analysis logic 304 to generate a set of explanations for each encryption recommendation.

Of course, it is possible to output encryption recommendations without providing any associated explanation. For this reason, explain recommendations analysis logic 306 may be thought of as optional. For example, in certain embodiments, explain recommendations analysis logic 306 may be disabled or simply not included within code analysis tool 300.

One manner in which the explain recommendations analysis may be carried out will now be described in reference to flowchart 900 of FIG. 9. The method of flowchart 900 is described herein by way of illustration only. Other methods, including variations of the method of flowchart 900, may be used to generate explanations for encryption recommendations made for data elements within application code 310. For the sake of illustration, the method of flowchart 900 will now be described with continued reference to code analysis tool 300 of FIG. 3. However, the method is not limited to that embodiment.

The analysis builds upon the logic used for performing the encryption recommendation analysis. In particular, as shown at step 902, while encryption recommendation analysis logic 304 is conducting the bottom-up traversal of the ASTs representing application code 310 pursuant to generating encryption recommendations, explain recommendations analysis logic 306 tracks, for each expression in a given AST, dependencies with other expressions along with the operations that give rise to the dependencies. An indication of where such operations appear in the application code may also be tracked. For example, for a predicate "a=b", explain recommendations analysis logic 306 may track the following two dependencies:

(a, b, Equality, "a=b", "Procedure X Line Y Column Z")
(b, a, Equality, "a=b", "Procedure X Line Y Column Z").

As shown in step 904, explain recommendations analysis logic 306 represents the dependencies as a dependency graph where each vertex represents an expression in the AST representation of the application code and each edge a dependency between them.

Next, at step 906, for each data element of interest (e.g., for each database column), explain recommendations analysis logic 306 identifies subgraphs of the dependency graph that (a) contain the vertex of the data element of interest, and (b) whose operations together justify the encryption recommendation for the data element of interest. For example, a sub-graph that may explain why a column X cannot be encrypted may be:

Edge 1: Column X was used in an equality with column Y
Edge 2: Column X was used in an addition with column Z In one embodiment, explain recommendations analysis logic 306 computes all possible subgraphs for each column in a database. Step 906 may be carried out by enumerating all possible subgraphs for a column and identifying subgraphs that explain the recommendation for a column. In general the number of subgraphs is exponential in the number of edges of the graph (all possible combinations). Therefore, a brute force enumeration can be expensive. To address this issue, in one embodiment, explain recommendations analysis logic 306 enumerates the subgraphs systematically from smaller to larger graphs, stopping as soon as a valid explanation is found. One particular implementation of an algorithm for carrying out step 906 is formally described below.

---

The input to the algorithm is a dependency graph. The algorithm maintains
the following state.
Let S be the set of graphs that are pending to be processed.
Let Si be the i-th element in this set, i.e. the i-th graph.
Let Vi be the set of vertices that belong to the graph Si.
Let Ei be the set of edges that belong to the graph Si.
Let ENi be the set of edges that belong to the edges of the full
dependency graph, but haven't been used for graph Si.
Let Solutions be the set of graphs that have already been found to be a
solution of our problem
Let Processed be the set of graphs that we have already processed.
We start with S having only one set that comprises of only the vertex for
Column X.
V1 = {Column X}
E1 = Empty
Solutions = Empty
Processed = Empty
While S is not empty
Dequeue the first set Si.
If Processed contains Si
Continue to next element in S
Foreach graph G in Solutions
If G is a subgraph of Si
Continue to next element in S
Add Si to Processed
Iterate over Ei to identify if it gives a solution (e.g. has one Additive
and one Equality edge)
If it is a solution
Add Si to Solutions
Continue to the next element in S
Foreach edge e in ENi so that at least one of the vertices of the edge
belongs to Si.
Create a new graph G by adding this edge to Si
Add G at the end of S

---

The foregoing algorithm terminates because it will never loop around cycles. The algorithm only adds edges that are not part of the existing graph.

Furthermore, the foregoing algorithm finds the solutions with only the required edges. In other words, if a solution has already been found (e.g., if an addition operation and an equality operation have been found for the same data element, and there is no encryption scheme that supports both types of operations), the algorithm will not keep adding more edges because: (1) the algorithm starts with a 0 length and grows to size i+1 only after it has processed all i-sized graphs; (2) once a solution is found, the algorithm stops extending the graph; and (3) if a graph is a supergraph of a solution, the algorithm immediately evicts it. With reference to point (3), because graphs grow in size and never shrink, the algorithm is guaranteed to have found any subgraphs that are solutions before processing the supergraph.

Additionally, the foregoing algorithm does not return duplicates because the algorithm performs a check to determine if it has already processed a graph.

A further illustration of the analysis performed by explain recommendations analysis logic 306 will now be provided with reference to the example table "Employee", example Query Set 1, and example Query Set 2 introduced in the preceding subsection.

As noted above, the explain recommendations analysis creates a dependency graph using the constraints and dependencies collected thereby. All expressions comprise vertices of the dependency graph and all edges comprise dependencies. Furthermore, edges can have a property that defines the constraint. With reference to the example table "Employee", example Query Set 1, and example Query Set 2, the dependency graph would have the following vertices:
{FirstName, LastName, SSN, @SSN, Base_Salary, @base_salary, Annual_Bonus, @annual_bonus}
Furthermore, the dependency graph would have the following edges:
1) FirstName connected to LastName with the property Plaintext (since no encryption scheme can support string concatenation)
2) SSN connected to @SSN and the property Deterministic
3) Base_Salary connected to @base_salary and no property since this is a simple assignment
4) Annual_Bonus connected to @annual_bonus and no property since this is a simple assignment
5) @base_salary connected to @annual_bonus and the property Additive Now let's assume that there is one more query that performs Equality between Annual_Bonus and Base_Salary. This would require that both of these columns be represented as cleartext, since there is no encryption scheme that can support both Equality and Addition (which was required by Query Set 2). This would add an edge:
6) Base_salary connected to Annual_Bonus with the property Deterministic.

Explain recommendations analysis logic 306 operates to provide information to the user that will help explain why Base_Salary and Annual_Bonus must be represented in cleartext. By so doing, explain recommendations analysis logic 306 enables the user to change his application code (e.g., his queries) to work around this limitation.

Let us take Base_Salary for example. The algorithm described above starts with a graph that contains this vertex only and no edges and starts appending edges that contain at least one node in the current tree. In this case the edges that qualify are: 3 and 6. This results in the generation of two new graphs. The one with edge 3 doesn't have any constraints yet while the one with edge 6 has Deterministic as its constraint.

This process is continued recursively. In this case, because the graph is small, things are simple and the algorithm will quickly find the "explanation". For the first of the two graphs that were generated, the edges that qualify are: 5 and 6. For the second of the two graphs that were generated, the edges that qualify are: 3 and 4. Once the algorithm has found a graph that contains edges with constraints that lead to cleartext, the algorithm has solved the "explain" problem. In this case the interesting subgraph contains the edges (3, 4, 5 and 6). The edges have both the constraint for Additive through the intermediate variables, but also the constraint for Equality. Since the algorithm constructs graphs by incrementally adding more edges, it can guarantee that a solution with the smaller number of edges will be found first.

In accordance with the foregoing example, the explanation provided to the user is essentially the subgraph identified by the algorithm above:
Base_Salary requires Deterministic encryption because it is involved in an equality operation with Annual_Bonus
Base_Salary must have the same encryption as @base_salary
@base_salary require Additive encryption since it is involved in an addition operation Taken together, these requirements result in a recommendation of cleartext, since this is the only encryption scheme that can satisfy all of the requirements. In order for Base_Salary to be encrypted, the user must change his application code (in this case, his queries) in order to remove some of these constraints or dependencies.

The manner and form in which such explanations are provided to the user may vary from implementation to implementation. For example, in one embodiment, the output may include each data element of interest, the encryption scheme recommended for that data element (or cleartext if no encryption is recommended), and the operation(s) that give rise to the encryption scheme recommendation. Still further, the output may include an identification of where such operation are located or appear within the application code. Still other forms of presentation may be used.

D. Alternative Embodiment

In an alternative embodiment, the input to code analysis tool 300 also includes an identification of data elements referenced by application code 310 (e.g., columns) that a user of code analysis tool 300 (e.g., an application developer or publisher) considers sensitive and/or would like to apply encryption to. The foregoing algorithms would be executed in largely the same fashion as outlined above, except that at the end of the analysis, code analysis tool 300 would output encryption recommendations and associated explanations 330 for only those data items specified by the user. Encryption recommendations and associated explanations 330 may also include encryption recommendations and explanations for other data elements that are in a same encryption set as the user-specified data elements since they will have a dependency to the user-specified data elements. All other data elements would not be reported—that is to say, encryption recommendations and associated explanations 330 would not include information about the other data elements aside from the user-specified data elements and the data elements having dependencies therewith.

Such an implementation advantageously enables a user to focus the analysis on only data elements in which they are interested. The output provided would enable the user to determine whether each of the user-specified data elements could be encrypted, the highest level of encryption that may be applied thereto, and an explanation for each recommendation. Such explanation can help the user determine how best to modify the application code to increase the level of encryption that may be applied to one or more of the user-specified data elements.

III. Example Computer System Implementation

FIG. 10 depicts an example processor-based computer system 1000 that may be used to implement various embodiments described herein. For example, system 1000 may be used to implement any of end user terminals 104$_1$-104$_N$, middle tier application server 106, database server 108, end user terminals 204$_1$-204$_N$, middle tier application server 206, database server 208, and code analysis tool 300 as described above in reference to FIGS. 1-3. System 1600 may also be used to implement any or all of the steps of any or all of the flowcharts depicted in FIGS. 4-9. The description of system 1000 provided herein is provided for purposes of illustration, and is not intended to be limiting. Embodiments may be implemented in further types of computer systems, as would be known to persons skilled in the relevant art(s).

As shown in FIG. 10, system 1000 includes a processing unit 1002, a system memory 1004, and a bus 1006 that couples various system components including system memory 1004 to processing unit 1002. Processing unit 1002 may comprise one or more microprocessors or microprocessor cores. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

System 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, BLU-RAY™ disk or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processing unit 1002 to perform any or all of the functions and features of end user terminals 104$_1$-104$_N$, middle tier application server 106, database server 108, end user terminals 204$_1$-204$_N$, middle tier application server 206, database server 208, and code analysis tool 300 as described above in reference to FIGS. 1-3. The program modules may also include computer program logic that, when executed by processing unit 1002, performs any of the steps or operations shown or described in reference to the flowcharts of FIGS. 4-9.

A user may enter commands and information into system 1000 through input devices such as a keyboard 1038 and a pointing device 1040 (e.g., a mouse). Other input devices (not shown) may include a microphone, joystick, game controller, scanner, or the like. In one embodiment, a touch screen is provided in conjunction with a display 1044 to allow a user to provide user input via the application of a touch (as by a finger or stylus for example) to one or more points on the touch screen. These and other input devices are often connected to processing unit 1002 through a serial port interface 1042 that is coupled to bus 1006, but may be connected by other interfaces, such as a parallel port, game port, or a universal serial bus (USB). Such interfaces may be wired or wireless interfaces.

Display 1044 is connected to bus 1006 via an interface, such as a video adapter 1046. In addition to display 1044, system 1000 may include other peripheral output devices (not shown) such as speakers and printers.

System 1000 is connected to a network 1048 (e.g., a local area network or wide area network such as the Internet) through a network interface or adapter 1050, a modem 1052, or other suitable means for establishing communications over the network. Modem 1052, which may be internal or external, is connected to bus 1006 via serial port interface 1042.

As used herein, the terms "computer program medium," "computer-readable medium," and "computer-readable storage medium" are used to generally refer to memory devices or storage structures such as the hard disk associated with hard disk drive 1014, removable magnetic disk 1018, removable optical disk 1022, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050, serial port interface 1042, or any other interface type. Such computer programs, when executed or loaded by an application, enable system 1000 to implement features of embodiments of the present invention discussed herein. Accordingly, such computer programs represent controllers of the system 1000.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1000 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

IV. Additional Exemplary Embodiments

An apparatus is described herein that includes one or more processors and one or more memory devices connected to the one or more processors. The one or more memory devices store computer program logic that is executable by the one or more processors. The computer program logic includes encryption recommendation analysis logic that, when executed by the one or more processors, is operable to receive application code and database schema information, to analyze the application code and the database schema information to identify a recommended encryption scheme for each of one or more data elements referenced by the application code, and to output an identification of each of the one or more data elements and the recommended encryption scheme associated therewith.

In one embodiment of the foregoing apparatus, the encryption recommendation analysis logic is operable to identify the strongest encryption scheme that can be applied to each of the one or more data elements from among a predefined set of encryption schemes without altering the semantics of the application code.

In another embodiment of the foregoing apparatus, the encryption recommendation analysis logic is operable to select the recommended encryption scheme for each of the one or more data elements from a set of encryption schemes that includes one or more of: a randomized encryption scheme; a deterministic encryption scheme; and cleartext.

In yet another embodiment of the foregoing apparatus, the application code comprises one or more of: one or more queries; and one or more stored procedures.

In still another embodiment of the foregoing apparatus, the encryption recommendation analysis is operable to: assign each data element in the application code to its own set and to map each set to a strongest encryption scheme from among a predefined set of encryption schemes; traverse each of one or more abstract syntax trees in an abstract syntax tree representation of the application code to visit each of one or more expressions included therein; and for each expression visited, to determine the strongest encryption scheme from among the predefined set of encryption schemes that can be applied to the data operated upon by the expression and modify the set(s) and mapping(s) accordingly.

In a further embodiment of the foregoing apparatus, the computer program logic further comprises deferred evaluation analysis logic that, when executed by the one or more processors, is operable to identify expressions within the application code that can be deferred to a client by a database server. In accordance with such an embodiment, the encryption recommendation analysis logic is operable to identify the recommended encryption scheme for each of the one or more data elements by taking into account the expressions within the application code that can be deferred to the client by the database server.

In further accordance with such an embodiment, the deferred evaluation analysis logic may be operable to: convert the application code into one or more abstract syntax trees, each abstract syntax tree including one or more expressions; associate a deferred evaluation flag with each expression in each of the one or more abstract syntax trees and initialize each deferred evaluation flag to a true value; and iteratively perform a top down pass over each of the one or more abstract syntax trees to discover variables that must be evaluated eagerly and set the deferred evaluation flag for each such variable to a false value until no new variables that must be evaluated eagerly are discovered.

In still further accordance with such an embodiment, the deferred evaluation analysis logic may be operable to perform a top down pass over each of the one or more abstract syntax trees to discover variables that must be evaluated eagerly by: setting the deferred evaluation flag to the false value for all expressions for which evaluation cannot be deferred; propagating the value of the deferred evaluation flag from parent expressions having a deferred evaluation flag with the false value to child expressions having a deferred evaluation flag with the true value; and updating a set of variables that must be evaluated eagerly. Setting the deferred evaluation flag to the false value for all expressions for which evaluation cannot be deferred may comprise setting the deferred evaluation flag to the false value for one or more of the following expression types: expressions that have side effects; expressions that are deemed too expensive to push to a client; control flow statements; and expressions that assign to variables that must be evaluated eagerly.

In a still further embodiment of the foregoing apparatus, the computer program logic further comprises explain recommendations analysis logic that, when executed by the one or more processors, is operable to generate an explanation regarding why each recommended encryption scheme was identified for each of the one or more data elements.

In accordance with such an embodiment, the explanation may comprise an identification of one or more operations in the application code that gave rise to the identification of the recommended encryption scheme for each of the one or more data elements. The explanation may further comprises an identification of a location within the application code at which each of the one or more operations are found.

In further accordance with such an embodiment, the explain recommendations analysis logic may be operable to: while a bottom-up traversal is being performed that visits each of one or more expressions in each of one or more abstract syntax trees that represent the application code, for each expression visited, track dependencies with other expressions along with one or more operations that cause the dependencies; represent the dependencies as a dependency graph having one or more vertices and one or more edges, wherein each vertex in the dependency graph represents an expression in the abstract syntax trees and each edge in the dependency graph represents a dependency between them; and for each of the one or more data elements, identify one or more subgraphs of the dependency graph that contain the data element and whose operations justify the identification of the recommended encryption scheme for the data element. The explain recommendations analysis logic may be operable to identify the one or more subgraphs of the dependency graph that contain the data element and whose operations justify the identification of the recommended encryption scheme for the data element by enumerating subgraphs of the dependency graph systematically from smaller to larger subgraphs and stopping as soon as the one or more subgraphs are identified whose operations justify the identification of the recommended encryption scheme for the data element.

A computer-implemented method for analyzing application code to recommend encryption of data elements referenced thereby without affecting program semantics is also described herein. The method includes: receiving application code and database schema information; analyzing the application code and the database schema information to identify a recommended encryption scheme for each of one or more data elements referenced by the application code; and outputting an identification of each of the one or more data elements and the recommended encryption scheme associated therewith in a form that is viewable by a user.

In one embodiment of the foregoing method, analyzing the application code and the database schema information to identify the recommended encryption scheme for each of one or more data elements referenced by the application code comprises analyzing the application code and the database schema information to identify the strongest encryption scheme that can be applied to each of the one or more data elements from among a predefined set of encryption schemes without altering the semantics of the application code.

In another embodiment, the foregoing method further includes identifying expressions within the application code that can be deferred to a client by a database server, wherein analyzing the application code and the database schema information to identify a recommended encryption scheme for each of the one or more data elements includes taking into account the expressions within the application code that can be deferred to the client by the database server.

In yet another embodiment, the foregoing method further includes generating an explanation regarding why each recommended encryption scheme was identified for each of the one or more data elements and outputting each explanation in a form that is viewable by a user. Generating the explanation may comprise generating an identification of one or more operations in the application code that gave rise to the identification of the recommended encryption scheme for each of the one or more data elements.

A computer program product is also described herein. The computer program product comprises a computer-readable memory having computer program logic recorded thereon that when executed by at least one processor causes the at least one processor to perform a method comprising: receiving application code; analyzing at least the application code to select a recommended encryption scheme for each of one or more data elements referenced by the application code and to generate an explanation regarding why the recommended encryption scheme was selected for each of the one or more data elements, each explanation comprising an identification of one or more operations in the application code; and outputting an identification of each of the one or more data elements and the recommended encryption scheme and explanation associated therewith.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An apparatus, comprising:
one or more processors; and
one or more memory devices connected to the one or more processors, the one or more memory devices storing computer program logic that is executable by the one or more processors, the computer program logic comprising:
encryption recommendation analysis logic that, when executed by the one or more processors, is operable to receive application code and database schema information associated with a database, the database schema information comprising information concerning a logical organization or structure of the database and from which dependencies between one or more data elements referenced by the application code and stored in the database can be determined, to analyze the application code and the database schema information to identify a recommended encryption scheme for each of the one or more data elements by
assigning each data element in the application code to its own set and mapping each set to a strongest encryption scheme from among a predefined set of encryption schemes, the assigning being based at least in part on the dependencies determined between the one or more data elements,
traversing each of one or more abstract syntax trees in an abstract syntax tree representation of the application code to visit each of one or more expressions included therein, and
for each expression visited, determining the strongest encryption scheme from among the predefined set of encryption schemes that can be applied to the data operated upon by the expression and modifying the set(s) and mapping(s) accordingly, and
to output an identification of each of the one or more data elements and the recommended encryption scheme associated therewith.

2. The apparatus of claim 1, wherein the encryption recommendation analysis logic is operable to identify the strongest encryption scheme that can be applied to each of the one or more data elements from among the predefined set of encryption schemes without altering the semantics of the application code.

3. The apparatus of claim 1, wherein the encryption recommendation analysis logic is operable to select the recommended encryption scheme for each of the one or more data elements from the predefined set of encryption schemes that includes one or more of:
a randomized encryption scheme;
a deterministic encryption scheme; and
cleartext.

4. The apparatus of claim 1, wherein the application code comprises one or more of:
one or more queries; and
one or more stored procedures.

5. The apparatus of claim 1, wherein the computer program logic further comprises:
deferred evaluation analysis logic that, when executed by the one or more processors, is operable to identify expressions within the application code that can be deferred to a client by a database server;
wherein the encryption recommendation analysis logic is operable to identify the recommended encryption scheme for each of the one or more data elements by taking into account the expressions within the application code that can be deferred to the client by the database server.

6. The apparatus of claim 5, wherein the deferred evaluation analysis logic is operable to:
convert the application code into the one or more abstract syntax trees;
associate a deferred evaluation flag with each expression in each of the one or more abstract syntax trees and initialize each deferred evaluation flag to a true value; and
iteratively perform a top down pass over each of the one or more abstract syntax trees to discover variables that must be evaluated eagerly and set the deferred evaluation flag for each such variable to a false value until no new variables that must be evaluated eagerly are discovered, wherein the variables that must be evaluated eagerly comprise variables that cannot be evaluated via deferred evaluation.

7. The apparatus of claim 6, wherein the deferred evaluation analysis logic is operable to perform a top down pass over each of the one or more abstract syntax trees to discover variables that must be evaluated eagerly by:
setting the deferred evaluation flag to the false value for all expressions for which evaluation cannot be deferred;
propagating the value of the deferred evaluation flag from parent expressions having a deferred evaluation flag with the false value to child expressions having a deferred evaluation flag with the true value; and
updating a set of variables that must be evaluated eagerly.

8. The apparatus of claim 7, wherein setting the deferred evaluation flag to the false value for all expressions for which evaluation cannot be deferred comprises setting the deferred evaluation flag to the false value for one or more of the following expression types:
expressions that have side effects;
expressions that are deemed too expensive to push to a client;
control flow statements; and
expressions that assign to variables that must be evaluated eagerly.

9. The apparatus of claim 1, wherein the computer program logic further comprises:
explain recommendations analysis logic that, when executed by the one or more processors, is operable to generate an explanation regarding why each recommended encryption scheme was identified for each of the one or more data elements.

10. The apparatus of claim 9, wherein the explanation comprises an identification of one or more operations in the application code that gave rise to the identification of the recommended encryption scheme for each of the one or more data elements.

11. The apparatus of claim 10, wherein the explanation further comprises an identification of a location within the application code at which each of the one or more operations are found.

12. The apparatus of claim 9, wherein the explain recommendations analysis logic is operable to:
while a bottom-up traversal is being performed that visits each of one or more expressions in each of the one or more abstract syntax trees that represent the application code, for each expression visited, track dependencies with other expressions along with one or more operations that cause the dependencies;
represent the dependencies as a dependency graph having one or more vertices and one or more edges, wherein each vertex in the dependency graph represents an expression in the abstract syntax trees and each edge in the dependency graph represents a dependency between them; and
for each of the one or more data elements, identify one or more subgraphs of the dependency graph that contain the data element and whose operations justify the identification of the recommended encryption scheme for the data element.

13. The apparatus of claim 12, wherein the explain recommendations analysis logic is operable to identify the one or more subgraphs of the dependency graph that contain the data element and whose operations justify the identification of the recommended encryption scheme for the data element by:
enumerating subgraphs of the dependency graph systematically from smaller to larger subgraphs and stopping as soon as the one or more subgraphs are identified whose operations justify the identification of the recommended encryption scheme for the data element.

14. A computer-implemented method for analyzing application code to recommend encryption of data elements referenced thereby without affecting program semantics, the method comprising:
receiving application code and database schema information associated with a database, the database schema information comprising information concerning a logical organization or structure of the database and from which dependencies between one or more data elements referenced by the application code and stored in the database can be determined;
analyzing the application code and the database schema information to identify a recommended encryption scheme for each of the one or more data elements by
assigning each data element in the application code to its own set and mapping each set to a strongest encryption scheme from among a predefined set of encryption schemes, the assigning being based at least in part on the dependencies determined between the one or more data elements,
traversing each of one or more abstract syntax trees in an abstract syntax tree representation of the application code to visit each of one or more expressions included therein, and
for each expression visited, determining the strongest encryption scheme from among the predefined set of encryption schemes that can be applied to the data operated upon by the expression and modifying the set(s) and mapping(s) accordingly; and
outputting an identification of each of the one or more data elements and the recommended encryption scheme associated therewith in a form that is viewable by a user.

15. The method of claim 14, wherein analyzing the application code and the database schema information to identify the recommended encryption scheme for each of the one or more data elements comprises:
analyzing the application code and the database schema information to identify the strongest encryption scheme that can be applied to each of the one or more data elements from among the predefined set of encryption schemes without altering the semantics of the application code.

16. The method of claim 14, further comprising:
identifying expressions within the application code that can be deferred to a client by a database server;
wherein analyzing the application code and the database schema information to identify a recommended encryption scheme for each of the one or more data elements includes taking into account the expressions within the application code that can be deferred to the client by the database server.

17. The method of claim 14, further comprising:
generating an explanation regarding why each recommended encryption scheme was identified for each of the one or more data elements; and
outputting each explanation in a form that is viewable by a user.

18. The method of claim 17, wherein generating the explanation comprises:
generating an identification of one or more operations in the application code that give rise to the identification of the recommended encryption scheme for each of the one or more data elements.

19. A computer program product comprising a computer-readable memory having computer program logic recorded thereon that when executed by at least one processor causes the at least one processor to perform a method comprising:
receiving application code and database schema information associated with a database, the database schema information comprising information concerning a logical organization or structure of the database and from which dependencies between one or more data elements referenced by the application code and stored in the database can be determined;
analyzing the application code and the database schema information to:
select a recommended encryption scheme for each of the one or more data elements by
assigning each data element in the application code to its own set and mapping each set to a strongest encryption scheme from among a predefined set of encryption schemes, the assigning being based at least in part on the dependencies determined between the one or more data elements,
traversing each of one or more abstract syntax trees in an abstract syntax tree representation of the application code to visit each of one or more expressions included therein, and
for each expression visited, determining the strongest encryption scheme from among the predefined set of encryption schemes that can be applied to the data operated upon by the expression and modifying the set(s) and mapping(s) accordingly, and
generate a user-viewable explanation regarding why the recommended encryption scheme was selected for each of the one or more data elements, each explanation comprising an identification of one or more operations in the application code; and
outputting an identification of each of the one or more data elements and the recommended encryption scheme and explanation associated therewith.

20. The computer program product of claim 19, wherein analyzing the application code and the database schema information comprises:
analyzing the application code and the database schema information to select the strongest encryption scheme that can be applied to each of the one or more data elements from among the predefined set of encryption schemes without altering the semantics of the application code.

\* \* \* \* \*